US008195880B2

(12) United States Patent
Gai et al.

(10) Patent No.: US 8,195,880 B2
(45) Date of Patent: Jun. 5, 2012

(54) INFORMATION HANDLING SYSTEM WITH IMMEDIATE SCHEDULING OF LOAD OPERATIONS IN A DUAL-BANK CACHE WITH DUAL DISPATCH INTO WRITE/READ DATA FLOW

(75) Inventors: Sanjeev Gai, Round Rock, TX (US); Guy Lynn Guthrie, Austin, TX (US); Hugh Shen, Round Rock, TX (US); William John Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 12/424,255

(22) Filed: Apr. 15, 2009

(65) Prior Publication Data

US 2010/0268887 A1     Oct. 21, 2010

(51) Int. Cl.
*G06F 13/00* (2006.01)
(52) U.S. Cl. ......... 711/120; 711/127; 711/130; 711/131
(58) Field of Classification Search .................. 711/120, 711/127, 130, 131
See application file for complete search history.

(56) References Cited

U.S. PATENT DOCUMENTS

| 4,399,506 | A | 8/1983 | Evans |
| 4,527,238 | A | 7/1985 | Ryan et al. |
| 4,707,784 | A | 11/1987 | Ryan et al. |
| 4,885,680 | A | 12/1989 | Anthony |
| 5,434,989 | A | * | 7/1995 | Yamaguchi ........................ 711/3 |
| 5,627,990 | A | | 5/1997 | Cord et al. |
| 5,627,993 | A | | 5/1997 | Abato et al. |
| 5,636,359 | A | | 6/1997 | Beardsley et al. |
| 5,740,399 | A | | 4/1998 | Mayfield |
| 5,774,643 | A | | 6/1998 | Lubbers et al. |
| 6,408,362 | B1 | | 6/1999 | Arimilli |

(Continued)

FOREIGN PATENT DOCUMENTS

EP          0683458 A1     11/1995

OTHER PUBLICATIONS

Brecht—"Evaluating Network Processing Efficiency with Processor Partitioning and Asynchronous I/O"—EuroSys 2006, Leuven, Belgium, pp. 265-278 (Apr. 18-21, 2006).

(Continued)

*Primary Examiner* — Pho M Luu
*Assistant Examiner* — Thao Bui
(74) *Attorney, Agent, or Firm* — Francis Lammes; Stephen J. Walder, Jr.; Diana R. Gerhardt

(57) ABSTRACT

An information handling system (IHS) includes a processor with a cache memory system. The processor includes a processor core with an L1 cache memory that couples to an L2 cache memory. The processor includes an arbitration mechanism that controls load and store requests to the L2 cache memory. The arbitration mechanism includes control logic that enables a load request to interrupt a store request that the L2 cache memory is currently servicing. The L2 cache memory includes dual data banks so that one bank may perform a load operation while the other bank performs a store operation. The cache system provides dual dispatch points into the data flow to the dual cache banks of the L2 cache memory.

18 Claims, 18 Drawing Sheets

U.S. PATENT DOCUMENTS

| | | | |
|---|---|---|---|
| 6,000,019 A * | 12/1999 | Dykstal et al. | 711/157 |
| 6,023,746 A | 2/2000 | Arimilli et al. | |
| 6,745,293 B2 * | 6/2004 | Lasserre et al. | 711/131 |
| 6,907,499 B2 | 6/2005 | Herbst et al. | |
| 6,973,545 B2 | 12/2005 | Cypher | |
| 7,305,522 B2 | 8/2006 | Clark | |
| 7,305,523 B2 | 8/2006 | Guthrie | |
| 7,308,537 B2 | 8/2006 | Fields, Jr. | |
| 7,366,841 B2 | 8/2006 | Clark | |
| 8,434,182 | 2/2007 | Yuan et al. | |
| 7,257,673 B2 * | 8/2007 | Emerson et al. | 711/108 |
| 7,305,524 B2 | 12/2007 | Hoover et al. | |
| 7,337,281 B2 | 2/2008 | Jin et al. | |
| 8,140,756 B2 | 3/2012 | Gai et al. | |
| 8,140,765 B2 | 3/2012 | Gai et al. | |
| 2004/0003180 A1 | 1/2004 | Cypher | |
| 2008/0055323 A1 | 3/2008 | Franaszek et al. | |
| 2008/0065809 A1 | 3/2008 | Eichenberger | |
| 2008/0082755 A1 * | 4/2008 | Kornegay et al. | 711/141 |
| 2009/0006765 A1 | 1/2009 | Friedman et al. | |
| 2010/0268883 A1 | 10/2010 | Ghai et al. | |
| 2010/0268890 A1 | 10/2010 | Ghai et al. | |
| 2010/0268895 A1 | 10/2010 | Ghai et al. | |

OTHER PUBLICATIONS

Burcea—"Predictor Virtualization"—ASPLOS 2008, Mar. 1-5, 2008, pp. 157-167.
USPTO U.S. Appl. No. 12/424,228.
USPTO U.S. Appl. No. 12/424,284.
USPTO U.S. Appl. No. 12/424,332.
Burcea, Ioana et al., "Predictor Virtualizetion", ASPLOS 2008, Mar. 1-5, 2008, pp. 157-197.
Kim, Daehyun et al., "Leveraging Cache Coherence in Active Memory Systems", Proceedings of the 16th ACM International Conference on Supercomputing, ICS'02, New York New York, Jun. 22-26, 2002, 12 pages.
Kumar, Rakesh et al., "Interconnections in Multi-core Architectures: Understanding Mechanisms, Overheads and Scaling", Proceedings of the 32nd International Symposium on Computer Architecture, ISCA'05, Jun. 4-8, 2005, pp. 408-419.
Somogyi, Stephen et al., "Spatial Memory Streaming", Proceedings of the 33rd Annual International Symposium on Computer Architecture, Jun. 2006, 12 pages.
Speight, Evan et al., "Adaptive Mechanisms and Policies for Managing Cache Hierarchies in Chip Multiprocessors", Proceedings of the 32nd Annual International Symposium on Computer Aschitecture, ISCA'05, 2005, 11 pages.
Ungerer, Theo et al., "A Survey of Processors with Explicit Multithreading", ACM Computing Surveys, vol. 35, No. 1, Mar. 2003, pp. 29-63.
Wenisch, Thomas F. et al., "Temporal Streaming of Shared Memory", IEEE, ACM SIGARCH Computer Architecture News, vol. 33, issue 2, 2005, pp. 222-233.
Final Office Action mailed Jan. 17, 2012 for U.S. Appl. No. 12/424,284, 16 pages.

* cited by examiner

100

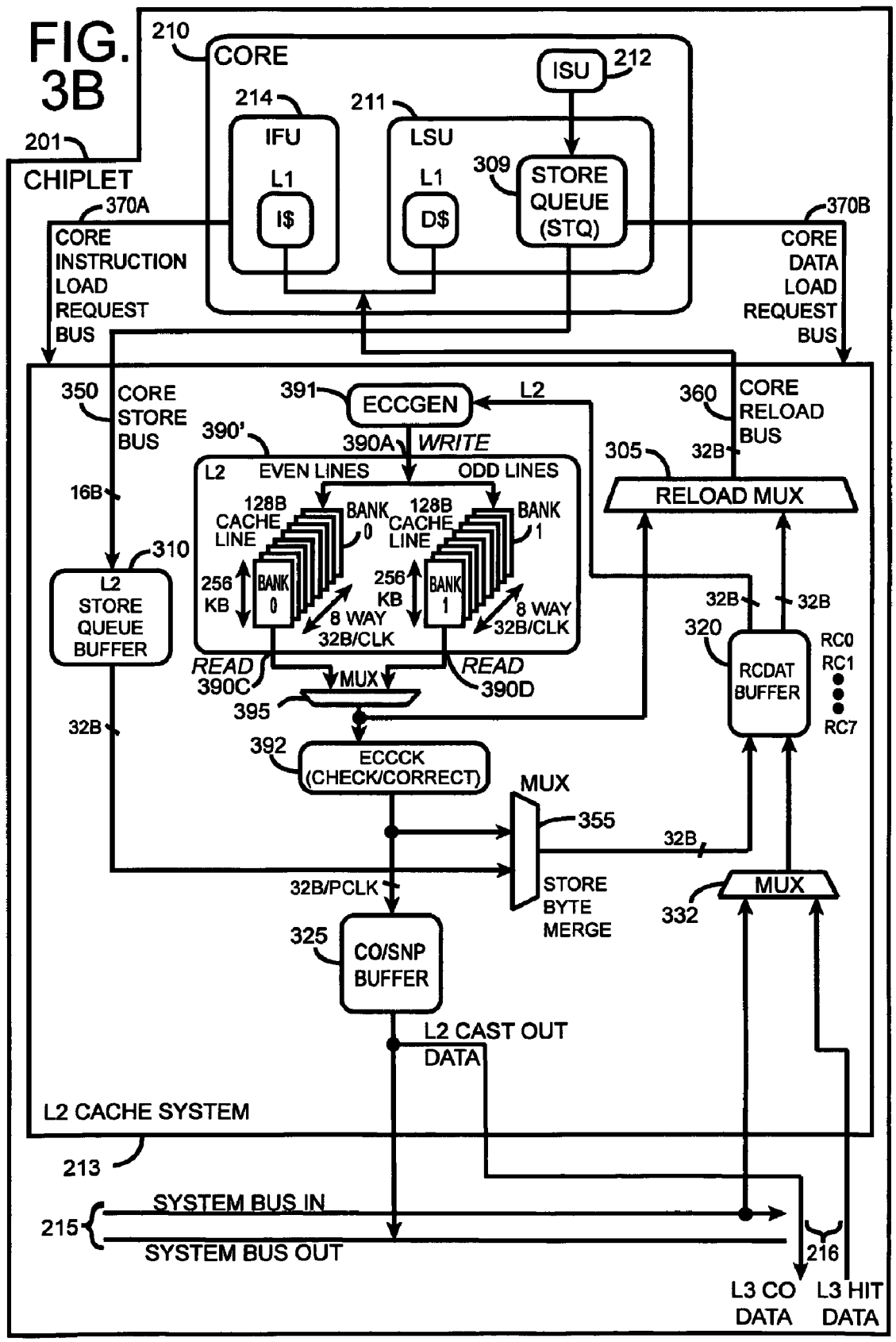

INFORMATION HANDLING SYSTEM WITH IMMEDIATE SCHEDULING OF LOAD OPERATIONS IN A DUAL-BANK CACHE WITH DUAL DISPATCH INTO WRITE/READ DATA FLOW

This invention was made with United States Government support under Agreement No. HR0011-07-9-0002 awarded by DARPA. The Government has certain rights in the invention.

BACKGROUND

The disclosures herein relate generally to information handling systems (IHSs), and more specifically, to cache memory systems that IHSs employ.

Information handling system (IHSs) employ processors that process information or data. Current day processors frequently include one or more processor cores on a common integrated circuit (IC) die. A processor IC may also include one or more high-speed cache memories to match a processor core to a system memory that typically operates at significantly slower speeds than a processor core and the cache memory. The cache memory may be on the same integrated circuit (IC) chip as the processor or may be external to a processor IC. Processor cores typically include a load-store unit (LSU) that handles load and store requests for that processor core. Before accessing system memory, the processor attempts to satisfy a load request from the contents of the cache memory. In other words, before accessing system memory in response to a load or store request, the processor first consults the cache memory.

BRIEF SUMMARY

In one embodiment, a processor memory caching method is disclosed. The method includes sending, by a processor element, a plurality of requests for memory operations to a cache memory, the cache memory including first and second cache banks, the operations including load operations and store operations, each load and store operation exhibiting a respective size requirement. The method also includes arbitrating, by an arbitration mechanism, among the plurality of requests for memory operations to select a particular load operation and a particular store operation for access to the cache memory. The method further includes commencing, by the arbitration mechanism, the particular load operation on the first cache bank during a first cache cycle. The method still further includes commencing, by the arbitration mechanism, the particular store operation on the second cache bank during the first cache cycle such that both the particular load operation and the particular store operation commence during the same first cache cycle. The method also includes performing, by the first and second cache banks, the particular load operation and the particular store operation simultaneously.

In another embodiment, a cache memory system is disclosed. The cache memory system includes a processor element. The cache memory system also includes a cache memory, coupled to the processor element, that receives a plurality of requests for memory operations. The cache memory includes first and second cache banks. The operations include load operations and store operations, each load and store operation exhibiting a respective size requirement. The cache memory includes an arbitration mechanism that arbitrates among the plurality of requests for memory operations to select a particular load operation and a particular store operation for access to the cache memory. The arbitration mechanism commences the particular load operation on the first cache bank during a first cache cycle and commences the particular store operation on the second cache bank during the first cache cycle such that both the particular load operation and the particular store operation commence during the same first cache cycle. The first and second cache banks perform the particular load operation and the particular store operation substantially simultaneously.

In another embodiment, an information handling system (IHS) is disclosed that includes the cache memory system described above coupled to a system memory.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 3B is a data flow diagram of a chiplet that includes the disclosed cache management system that employs a dual-bank cache memory.

DETAILED DESCRIPTION

In one embodiment, the disclosed information handling system (IHS) includes a cache and directory management mechanism with an L2 store-in cache that provides minimal core latency by giving load operations the ability to interrupt internal L2 multi-beat store operations that are already in progress. This provides the load operation with immediate access to the L2 cache and causes the interrupted store operation to recycle and proceed efficiently where it left off at the point of interruption. This mechanism may increase core performance by treating core load accesses as immediate access type operations at the expense of delaying or interrupting less sensitive store operations.

Figure 1:
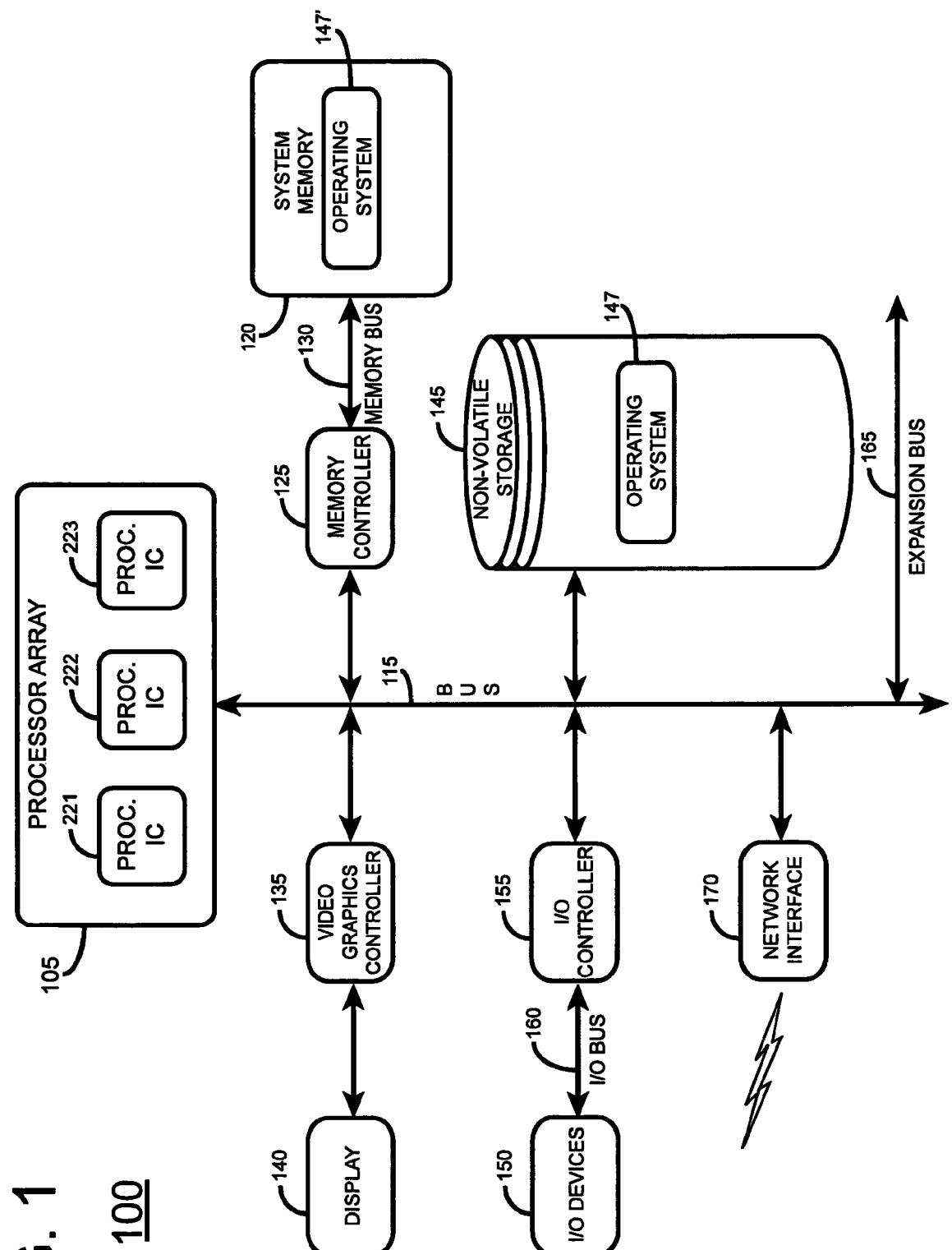
FIG. 1 shows a block diagram of one embodiment of the disclosed information handling system (IHS).

FIG. 1 shows one embodiment of information handling system (IHS) 100 that includes a processor array 105 that employs the disclosed cache and directory management mechanism. Processor array 105 includes representative processors 221, 222 and 223. In practice, processor array 105 may include more or fewer processor than shown in FIG. 1 depending on the particular application. Each of processors 221, 222 and 223 may include multiple processor cores, i.e. processor elements. IHS 100 processes, transfers, communicates, modifies, stores or otherwise handles information in digital form, analog form or other form.

IHS 100 includes a bus 115 that couples processor array 105 to system memory 120 via a memory controller 125 and memory bus 130. In one embodiment, system memory 120 is external to processor array 105. System memory 120 may be a static random access memory (SRAM) array or a dynamic random access memory (DRAM) array. Processor array 105 may also include local memory (not shown) such as L1 and L2 caches (not shown) on the semiconductor dies of processors 221, 222 and 223. A video graphics controller 135 couples display 140 to bus 115. Nonvolatile storage 145, such as a hard disk drive, CD drive, DVD drive, or other nonvolatile storage couples to bus 115 to provide IHS 100 with permanent storage of information. Nonvolatile storage 145 provides permanent storage to an operating system 147. Operating system 147 loads in memory 120 as operating system 147' to govern the operation of IHS 100. I/O devices 150, such as a keyboard and a mouse pointing device, couple to bus 115 via I/O controller 155 and I/O bus 160. One or more expansion busses 165, such as USB, IEEE 1394 bus, ATA, SATA, PCI, PCIE and other busses, couple to bus 115 to facilitate the connection of peripherals and devices to IHS 100. A network interface adapter 170 couples to bus 115 to enable IHS 100 to connect by wire or wirelessly to a network and other information handling systems. While FIG. 1 shows one IHS that employs processor array 105, the IHS may take many forms. For example, IHS 100 may take the form of a desktop, server, portable, laptop, notebook, or other form factor computer or data processing system. IHS 100 may take other form factors such as a gaming device, a personal digital assistant (PDA), a portable telephone device, a communication device or other devices that include a processor and memory.

Figure 2:
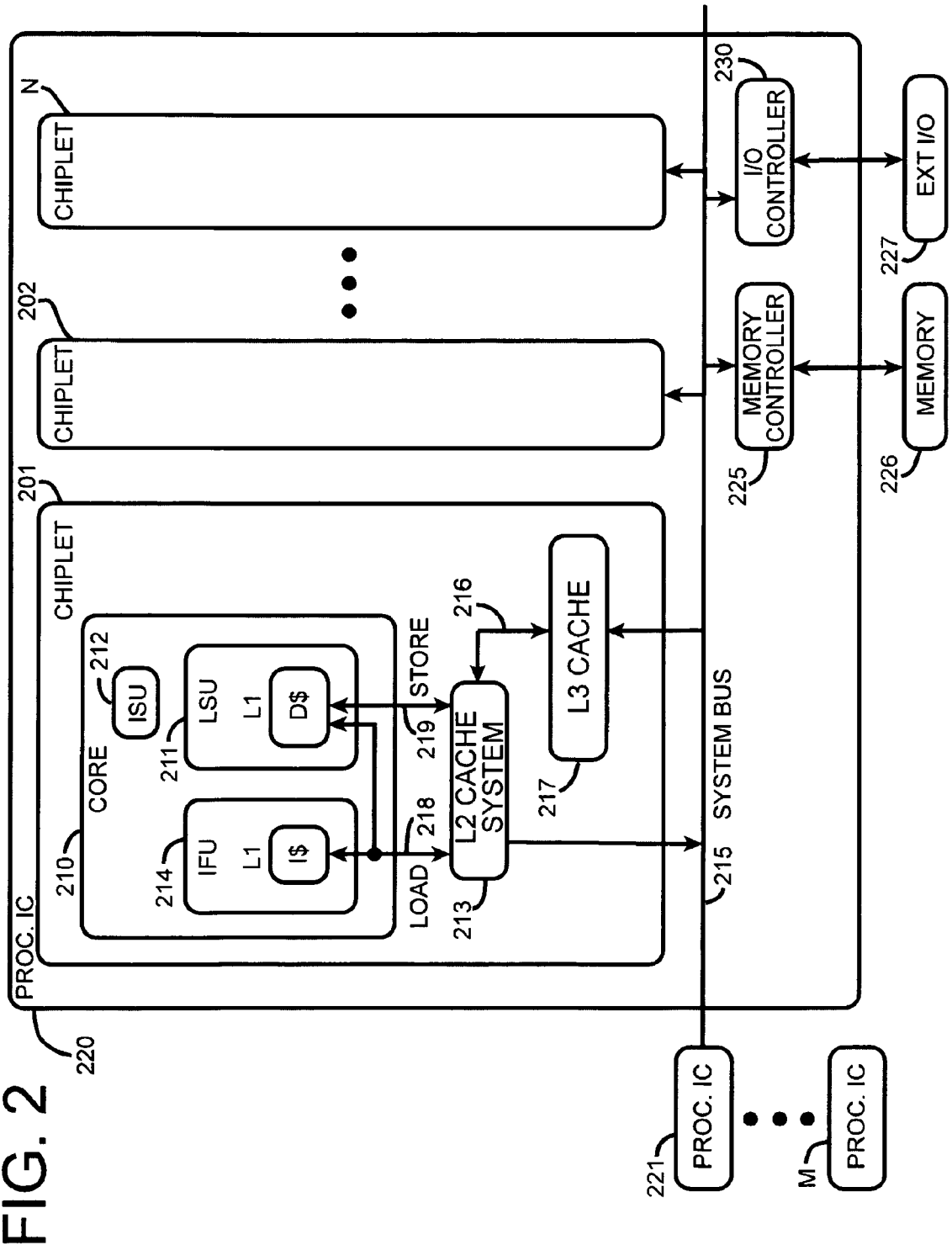
FIG. 2 shows a block diagram of a processor integrated circuit that includes the disclosed cache management system.

FIG. 2 is a block diagram of a representative processor integrated circuit (PROC IC) 220. Processor integrated circuit 220 includes a chiplet 201, chiplet 202 . . . N, wherein N is an integer. In more detail, chiplet 201 is a portion of an integrated circuit die that includes a processor core 210, an instruction fetch unit (IFU) 214, a load store unit (LSU) 211, and an instruction scheduling unit (ISU) 212. Instruction fetch unit (IFU) 214 includes an L1 instruction cache designated L1 I$ that couples to L2 cache system 213 via instruction load bus 218. Processor core 210 is an example of a processor element. Load store unit (LSU) 211 includes an L1 data cache designated L1 D$ that couples to L2 cache system 213 via store bus 219 and load bus 218. Load bus 218 enables both the L1 data cache L1 D$ and the L1 instruction cache I$ to receive data from L2 cache system 213. Store bus 219 enables the LSU 211 to send data for store operations to L2 cache system 213. Load bus 218 transports load operations from IFU 214 and LSU 211 to L2 cache system 213. Store bus 219 transports store operations from core 210 to L2 cache system 213.

Chiplet 201 further includes an L2 cache system 213 that couples to the instruction cache L1 I$ and to data cache L1 D$, as shown. L2 cache system 213 couples via bus 216 to L3 cache 217. The size of L3 cache memory 217 is larger than that of L2 cache memory 213. For example, in one embodiment, L2 cache memory 213 exhibits a size of 256 KB and L3 cache memory 217 exhibits a size of 4 MB. The size of these cache memories may vary and is not limited to these representative values. L2 cache system 213 is a unified cache in that it stores both instructions and data.

L2 cache system 213 and L3 cache 217 couple to system bus 215. Chiplets 202 . . . N also couple to system bus 215. A memory controller 225 couples between system bus 225 and a system memory 226 external 225 to processor IC 220. An I/O controller 230 couples between system bus 215 and external I/O devices 227. Other processor integrated circuits 221 . . . M may couple to system bus 215 as shown. M is in integer that represents the number of processors in a particular implementation.

In this particular embodiment, the L1 instruction and data caches are high speed memory that allow for quick access to the information in the L1 cache, such as within 3 processor clock (3 PCLK) cycles, for example. The L1 cache stores validity information indicating whether the particular entries therein are currently valid or invalid. The L2 cache system 213 is a store-in cache wherein load and store operations may execute by using the information in the L1 cache if there is a hit in the L1 cache. If a cache line containing the information that a load or store operation needs is not in the L1 cache, then the L2 cache system 213 is responsible to go find the coherent copy of the cache line, pull in the cache line and match the cache line up with the respective load or store operation. Processor core 210 thus does not see main memory, i.e. system memory 226, when the processor core 210 performs a load or store operation because it directs those operations to L2 cache system 213 if no hit occurs in the L1 cache.

In terms of core efficiency, execution of load operations is more important than the execution of load operations in the disclosed IHS. Assume for discussion purposes that the disclosed IHS executes a program. While executing the program, a processor core encounters a store operation request. When the core encounters the store operation request it puts the store operation request in the L1 cache and sends it to the L2 cache system 213 to make it coherently visible to the rest of the system. However, if core 210 can not immediately execute the store request operation, chiplet 201 may temporarily store the store request in a store queue (not shown in FIG. 2). Core 210 of chiplet 201 will continue executing instructions as long as the store queue does not fill up. However, if core 210 can not immediately execute a load operation request because the load operation is not available in the L1 cache, core 210 may stop and wait until the load operation request completes. Completion of this load operation request may involve retrieving the load operation from L2 cache system 213, L3 cache 217 or system memory 226. It is thus more important for load operations to execute quickly than for store operations. While load operations are latency sensitive for performance, store operations are bandwidth sensitive for performance. Store operations do not have a latency issue, however store operations do have a bandwidth aspect in the sense that since L2 cache system 213 sees all store operations as an incoming stream, L2 cache system 213 should not become backed-up. If the L2 cache system 213 becomes backed-up beyond a particular point, then this back-up will negatively impact core performance. In other words, if all store queues fill up, the incoming stream of store operations should stop to allow already queued store operations to process and clear.

L3 cache 217 couples to L2 cache system 213 such that requests coming from core 210 go first to L2 cache system 213 for fulfillment. From a coherency standpoint, core 210 exhibits 2 states, namely valid and invalid with respect to instructions and data. In one embodiment, the L2 cache system 213 exhibits a size of 256 KB and L3 cache 217 exhibits a size of 4 MB. Core 210 employs a store-through L1 cache. The L2 cache system 213 is a store-through cache such that L2 cache system 213 sees all store traffic. The L2 cache system 213 is the location in chiplet 201 where operations such as store operations are made coherently visible to the rest of the system. In other words, core 210 looks to the L2 cache system 213 to control the claiming of cache lines that core 210 may need. L2 cache system 213 controls the finding of such desired cache lines and the transport of these cache lines into the L2 cache memory. L2 cache system 213 is responsible for exposing its core 210 stores coherently to the system and for ensuring that the IFU 214 and LSU 211 caches remains coherent with the rest of the system. In one embodiment, the cache line size of L2 cache system 213 is 128 bytes. Other size cache lines are also acceptable and may vary according to the particular application.

The disclosed cache management methodology mixes load operations in with store operations in a manner that may increase L2 cache efficiency of IHS 100. Under certain circumstances, load operations may interrupt the handling of store operations by the L2 cache system 213 to provide load operations with more immediate access to information that core 210 needs to continue processing load operations.

Figure 3A:
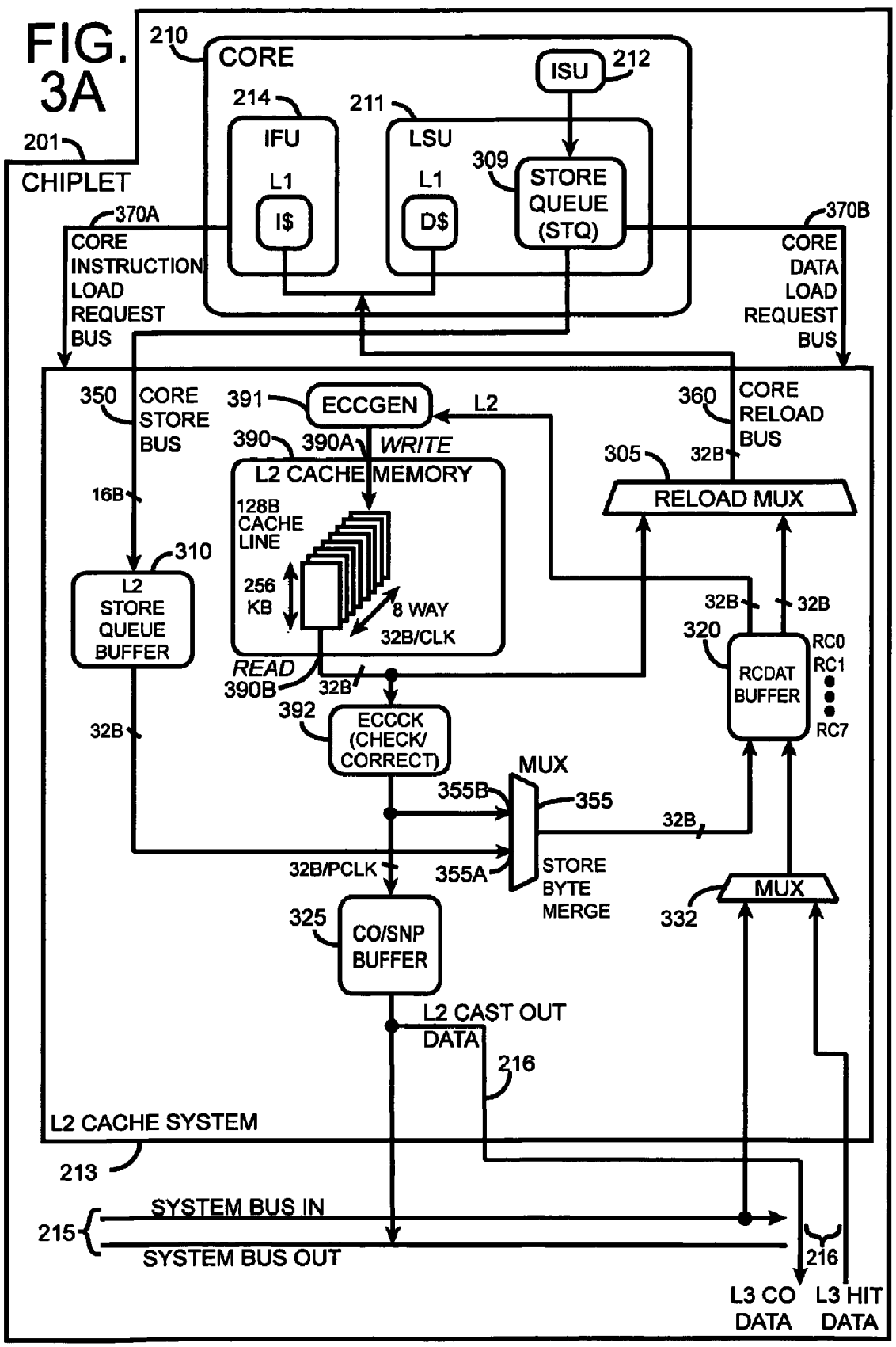
FIG. 3A is a data flow diagram of a chiplet that includes the disclosed cache management system that employs a single-bank cache memory.

FIG. 3A shows a representation of a data flow that IHS 100 may employ to practice the disclosed cache management methodology. FIG. 3A shows several of the structures of chiplet 201 in more detail than FIG. 2. When comparing the structures of FIG. 2 and FIG. 3, like numbers indicate like elements. More particularly, FIG. 3 shows a data flow for a chiplet 201 that includes a single bank L2 cache memory 390 in L2 cache system 213. In this particular embodiment, single bank L2 cache memory 390 is a 256 KB eight (8) way associative cache that employs 128 byte cache lines. Core 210 couples to L2 cache system 213 as shown. LSU 211 of core 210 includes a store queue (STQ) 309 that couples to an L2 store queue buffer 310 in L2 cache system 213. Store queue 309 cooperates with L2 store queue buffer 310 to supply L2 cache memory 390 with store operation requests. L2 cache system 213 determines if L2 cache memory 390 currently stores information that core 210 needs to execute a load or store operation. L2 cache system 213 efficiently arbitrates and intermixes load operations among store operations in a manner whereby a load operation may interrupt a store operation within the L2 cache. This action more quickly provides core 210 with information that core 210 needs to complete a load operation.

Core instruction load request bus 370A couples IFU 214 of core 210 to L2 cache system 213 to enable core 210 to send a load instruction request to L2 cache system 213 to bring in a requested instruction or code. Core data load request bus 370B couples LSU 211 to the L2 cache system 213 so the LSU 211 can send a load request to access the data that the LSU needs to perform the task that an instruction defines. Busses 370A and 370B together form load request bus 370. Core store bus 350 connects store queue (STQ) 309 of the LSU 211 in core 210 to L2 store queue buffer 310. Core store bus 350 enables store operation requests to enter L2 cache system 213 from store queue 309 of core 210. Such core store requests travel from store queue (STQ) 309 via core store bus 350 to the L2 store queue buffer 310. The L2 store queue buffer 310 packs together store requests, for example sixteen consecutive 8 byte store requests. In this manner, L2 cache 213 may perform one cache line install operation rather than sixteen. A core reload bus 360 couples a core reload multiplexer (MUX) 305 to the L1 instruction cache I$ and the L1 data cache D$ of core 210.

It takes multiple processor cycles, or P clocks (PCLKs), to process loads or stores through L2 cache system 213. In this particular embodiment, L2 cache memory 390 exhibits a size of 256 KB and employs a cache line size of 128 bytes. L2 cache memory 390 includes a cache write site or write input 390A and a cache read site or read output 390B. Busses into and out of L2 cache memory each exhibit 32 bytes. Since L2 cache memory 390 employs 128 byte cache lines, it takes 4 processor cycles (P clocks) to write information to L2 cache memory 390 and 4 processor cycles to read information from L2 cache memory 390.

There are different reasons why L2 cache system 213 may do a cache read or a cache write, for example in response to a load or store request coming down to the L2 cache from core 210. If core 210 sends L2 cache system 213 a load or store and L2 cache memory 390 does not contain a cache line that the load or store requires, then we have an L2 cache miss. In the event of an L2 cache miss, L2 cache system 213 must find the cache line needed by that load or store and install that cache line in L2 cache memory 390, thus resulting in a cache write. Read claim (RC) state machines RC0, RC1, . . . RC7 cooperate with RCDAT buffer 320 to retrieve the desired cache line and install the desired cache line in L2 cache memory 390. The desired cache line includes the designated information that the load or store from core 210 specifies. Reload multiplexer 305 also sends this designated information via core reload bus 360 to the L1 cache of core 210 so that core 210 may complete the load or store.

An error correction code generator (ECCGEN) 391 couples to the write input 390A of L2 cache memory 390 to provide error correction codes to cache line writes of information to L2 cache memory 390 that result from load or store requests. An error correction code checker (ECCCK) 392 couples to the read output 392 of L2 cache memory 390 to check the error codes of cache lines read from cache memory 390 and to correct errors in such cache lines by using error correction code information from the L2 cache memory 390.

When core 210 sends a store operation to L2 cache system 213, L2 store queue buffer 310 packs or compresses this store operation with other store operations. Assuming that there was a hit, then the information that the store operation requires is present in L2 cache memory 390. L2 cache system 213 pulls the cache line that includes the designated store information out of L2 cache memory 390. ECCCK circuit 392 performs error checking and correction on the designated cache line and sends the corrected store information to one input of a two input store byte merge multiplexer 355. The remaining input of store byte merge multiplexer 355 couples to L2 store queue buffer 310. When L2 cache system 213 determines that there is an L2 cache hit for a store operation coming out of the L2 store queue buffer 310 at MUX input 355A, L2 cache system 213 pulls the information designated by that store operation from L2 cache 390. This designated information appears at MUX input 355B after error correction. Store byte merge MUX 355 merges the information on its inputs and supplies the information to read claim data (RCDAT) buffer 320. RCDAT buffer 320 operates in cooperation with RC (read claim) state machines RC0, RC1, . . . RC7 that control the operation of L2 cache system 213.

The function of a read claim (RC) state machine such as machines RC0, RC1, . . . RC7 is that, for every load or store that core 210 provides to L2 cache system 213, an RC machine will merge the data for that store, go find the data which is the subject of the store, and claim the cache line containing the store. The RC machine is either conducting a read for a store operation or claiming the data that is the subject of the store operation, namely claiming the desired cache line containing the target of the store operation. The RC machine cooperates with the RCDAT buffer 320 that handles the transport of the desired cache line that the RC machine finds and claims. Each RC machine may independently work on a task from the core, for example either a load or store request from core 210, by finding the cache line that the particular load or store requests needs. The desired cache line that the RC machine seeks may exist within the L2 cache system 213, the L3 cache (not shown in FIG. 3) connected to L3 bus 216 or in system memory (not shown in FIG. 3) coupled to system bus 215. The RC machine looks first in L2 cache memory 390 for the desired data. If the L2 cache memory 390 does not store the desired data, then the RC machine looks in the L3 cache coupled to L3 cache bus 216. If an L3 hit occurs, then the RC machines instructs MUX 332 to transfer the desired cache line, i.e. the L3 hit data, from L3 bus 216 to RCDAT buffer 320. Reload MUX 305 then passes the L3 hit data via core reload bus 360 to core 210 and then to L2 cache memory 390 via ECC generator 391.

If the RC machine does not find the desired cache line in the L3 cache, then an L3 miss condition exists and the RC machine continues looking for the desired cache line in the system memory (not shown) that couples to system bus 215. When the RC state machine finds the desired cache line in system memory, then the RC machines instructs MUX 332 to transfer the desired cache line from system bus 215 to RCDAT buffer 320. Reload MUX 305 then passes the desired cache line via core reload bus 360 to core 210 and then to L2 cache memory 390 via ECC generator 391.

RCDAT buffer 320 is the working data buffer for the 8 RC state machines RC0, RC1, . . . RC7. RCDAT buffer 320 is effectively a scratch pad memory for these RC state machines. RCDAT buffer 320 provides 128 bytes of dedicated storage per RC state machine. Thus a different 128 byte cache line may fit in each of RC state machines RC0, RC1, . . . RC7.

In the case of an L2 cache hit, L2 cache system 213 pulls the designated information out of L2 cache memory 390. If the store operation is for a store operation from the core 210, one of the read claim (RC) machines is responsible for finding that line either in the L2 cache or elsewhere, merging the found designated line at store byte merge buffer 355 if the RC machine finds the designated line in the L2 cache, or merging the found designated line in the RCDAT buffer 320 if the RC machine does not find the designated line in the L2 cache. Once the RC machine completes the installation of the merged line in RCDAT buffer 320, then it puts the designated line back in the L2 cache memory 390.

Once an operation is in the RCDAT data buffer 320, if that operation is a store operation, then the RCDAT data buffer 320 needs to write that operation back into L2 cache memory 390, as described above. However, if that operation in the RCDAT data buffer 305 is a load operation and there is a hit in the L2 cache, then the load operation takes a path through store byte merge MUX 355 similar to the case of the store operation described above. However, in the case of a load operation hit in the L2 cache, the designated hit cache line in L2 cache memory 390 passes through MUX 355 with no merge operation and goes into RCDAT buffer 320 for storage. The designated hit cache line for the load operation then travels directly to core 210 via reload MUX 305 and core reload bus 360. By "directly" here we mean that the designated hit cache line for the load passes from RCDAT buffer 320 to core 210 without passing through ECC generator 391 and its associated delay. However, if error checker 392 determines that the designated hit cache line found in L2 cache memory 390 does exhibit an error, then error checker 392 corrects the error and places the corrected cache line in RCDAT buffer 320. In response, RCDAT buffer 320 redelivers the cache line, now corrected, to core 210.

L2 cache system 213 includes a cast out/snoop (CO/SNP) buffer 325 that couples between the read output 390B and L3 bus 216 and system bus 215 as shown. As cache lines write to L2 cache memory 390, old cache lines within L2 cache memory 390 may need removal to make room for a newer cache line. In this situation, a cast out state machine, discussed in more detail below, selects a victim cache line for expulsion from cache memory 390. The cast out state machine instructs CO/SNP buffer 325 to send the old cache line, namely the victim cache line, to the L3 cache (not shown) via L3 bus 216. The CO/SNP buffer 325 also couples to system bus 215 to enable the transport of victim cache lines to system memory (not shown) that couples to system bus 215. The L2 cast out data output of CO/SNP buffer 325 couples to L3 bus 216 and system bus 215 for this purpose. The CO/SNP buffer 325 also couples to system bus 215 to enable a snoop state machine (not shown in FIG. 3A) to allow other processor IC's such as processor IC 221 to snoop the cache line contents of L2 cache memory 390 as needed.

First and second embodiments of the disclosed cache management methodology may employ the single bank L2 cache configuration that FIG. 3A depicts. Third and fourth embodiments may employ the dual bank L2 cache configuration that FIG. 3B depicts. FIG. 3B is similar to FIG. 3A except for the dual bank L2 cache 390' architecture that FIG. 3B employs. Like numbers indicate like elements when comparing FIG. 3B with FIG. 3A. L2 cache memory 390' includes 2 banks of high speed cache memory, namely BANK0 and BANK1. BANK0 is a 256 KB eight (8) way set associative cache with 128 B cache lines. Likewise, BANK1 is a 256 KB eight (8) way set associative cache with 128 B cache lines. BANK0 stores even cache lines while BANK1 stores odd cache lines. If a particular cache line exhibits a least significant bit (LSB) that is 0, then that cache line is even and L2 cache 390' stores that even cache line in BANK0. However, if a particular cache line exhibits an LSB that is 1, then that cache line is odd and L2 cache 390' stores that odd cache line in BANK1. In this manner, it is possible to read from one bank while writing to the other. L2 cache memory 390' includes a read output 390C that supplies even cache lines to one input of a two input multiplexer 395. The remaining input of multiplexer 395 couples to a read output 390D that supplies odd cache lines. Multiplexer 395 can select either an even cache line from BANK0 or an odd cache line from BANK1 of L2 cache memory 390'.

Figure 4:
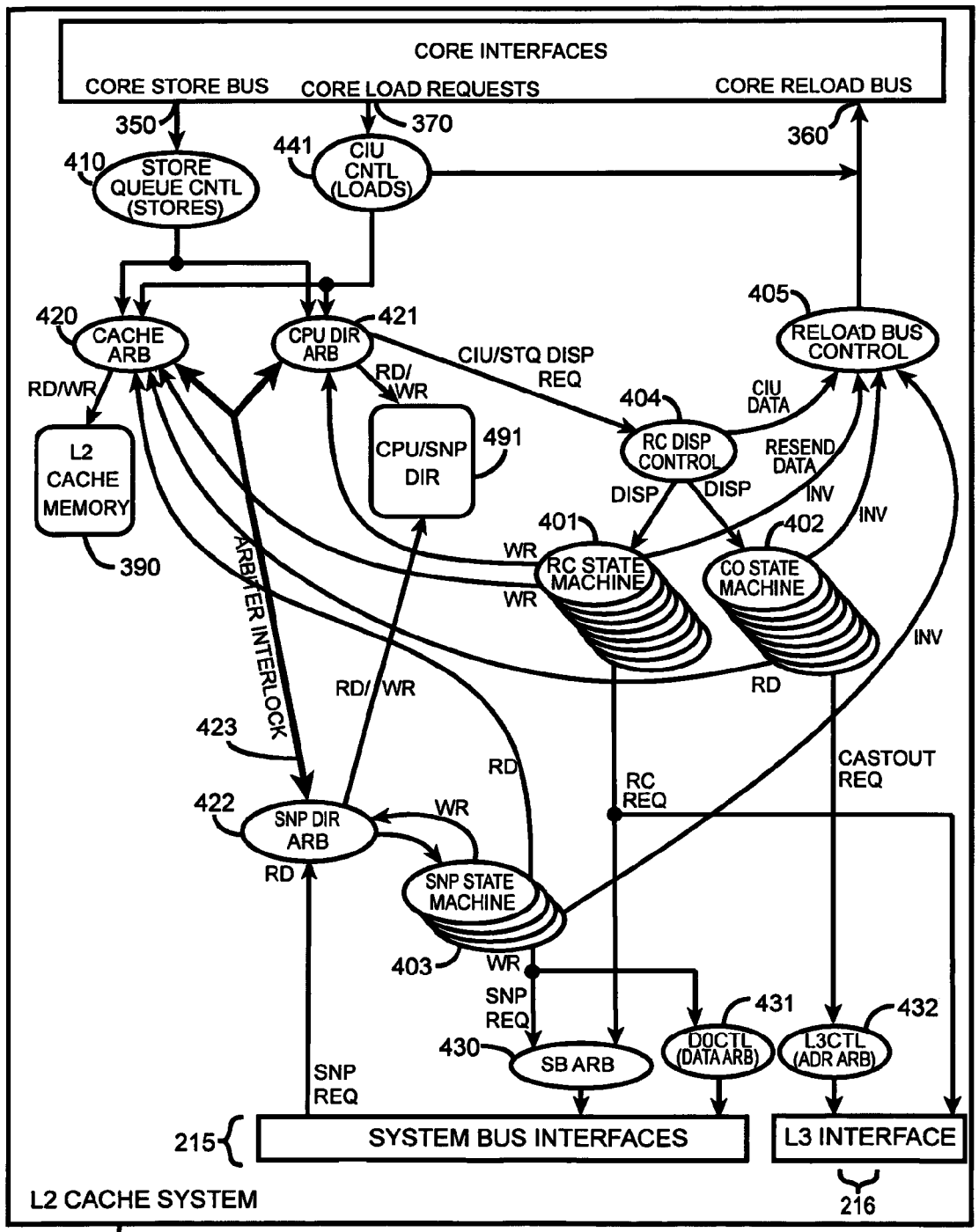
FIG. 4 is a control flow diagram for the disclosed cache management system.

While FIGS. 3A and 3B describe data flows for the disclosed L2 cache management apparatus and methodology, FIG. 4 shows a representative control flow for the structures of FIG. 3A and, 3B. The control flow that FIG. 4 depicts controls the mechanisms and structures of FIGS. 3A and 3B that carry out the disclosed cache management methodology. It is helpful to conceptually view the control flow of FIG. 4 as being superimposed on top of the data flow of FIG. 3A, or alternatively, on top of FIG. 3B. In many cases, the state machines and other control structures that FIG. 4 depicts may map to, or correspond to, respective structures within the L2 cache system 213 of FIGS. 3A and 3B. For convenience, the following discussion will relate the control flow of FIG. 4 with the single-bank L2 cache memory architecture of FIG.

3A, although the discussion is applicable as well to the dual-bank L2 cache memory architecture of FIG. 3B.

To help relate the control flow of FIG. 4 with the data flow of FIG. 3A, in many instances the elements in the control flow of FIG. 4 are numbered such that the last two digits correspond to the last two digits of the corresponding controlled structure within the data flow of FIG. 3A. For example, store queue control logic 410 of FIG. 4 controls the operation of L2 store queue buffer 310 of FIG. 3A. FIG. 4 depicts L2 cache memory 390 using the same number in FIG. 4 and FIG. 3A.

The control flow of FIG. 4 includes 1) state machines, 2) general control logic and 3) arbiters. The L2 cache system 213 of FIG. 4 includes a cache arbiter (CACHE ARB) 420 that schedules reads and writes in the L2 cache memory 309. Loads and stores coming from core 210 form these reads and writes. L2 cache system 213 of FIG. 4 includes a CPU directory arbiter (CPU DIR ARB) 421 that controls access to the CPU/snoop directory (CPU/SNP DIR) 491. CPU directory arbiter 421 controls access to the directory 491 "to the north", i.e. between L2 cache system 213 and core 210. Directory 491 stores address and state information for all cache lines in L2 cache memory 390. This state information may include the MESI state information for each cache line, namely "modified", "exclusive", "shared" or "invalid". While L2 cache memory 390 physically holds the data, directory 491 holds the address that associates with the individual pieces of data that the L 2 cache memory 390 stores. Snoop directory arbiter (SNP DIR ARB) 422 controls access to the directory 491 "to the south", i.e. between L2 cache system 213 and system bus interfaces 215.

Core 210 sends requests, i.e. loads and stores, to L2 cache system 213 for handling. Loads enter core interface unit control (CIU) logic 441 from core load request bus 370. Stores enter store queue control logic 410 from core store bus 350. As these load and store requests come in from core 210, CPU directory arbiter (CPU DIR ARB) 421 arbitrates between the load and store requests and sends the resultant arbitrated load and store requests to RC dispatch control (RC DISP CONTROL) logic 404. RC dispatch control logic 404 sends or dispatches these requests to a read claim (RC) state machine 401 or a cast out (CO) state machine 402, as appropriate. In one embodiment, eight (8) RC state machines are available and eight (8) CO state machines are available to handle such dispatches. If a store operation results in the need for a victim, a cast out state machine 402 determines the particular victim. The cast out state machine 402 expels the victim cache line and sends the victim cache line to L3 interface 216 for storage in the L3 cache. In more detail, L3 control logic (L3CTL) 432 is an address arbiter that handles cast out requests and sends the victim cache line to the L3 cache for storage. In the data flow of FIG. 4, WR designates a write operation and RD designates a read operation.

When an RC state machine 401 handles a load or store that involves a particular cache line, the RC state machine 401 first searches L2 cache memory 390 to see if L2 cache memory 390 contains the particular cache line. As seen by the line exiting the bottom of RC state machine 401 in FIG. 4, if the RC state machine does not find the particular cache line in L2 cache memory 390, then the request either goes to system bus 215 via the system bus arbiter (SB ARB) 430 or it goes to the L3 cache via L3 cache interface 216 as a read claim request (RC REQ). To summarize, when a load or store comes into an RC machine 401, the RC machine first looks in the L2 cache memory 390. If the cache line that the load or store request designates is not in the L2 cache memory 390, then the RC machine 401 sends the request to the L3 cache via the L3 interface bus 216. If the L3 cache responds back that the designated cache line for the request is not in the L3 cache, then the RC request goes through system bus arbiter (SB ARB) 430 out the system bus 215 to system memory.

L2 cache system 213 includes reload bus control logic 405 for delivering cache lines back to core 210 via core reload bus 360. Reload bus control logic 405 of the control flow of FIG. 4 controls reload MUX 305 of the data flow of FIG. 3A.

Other processor ICs on system bus 215 such as processor IC 221 may need to look in directory 491 to determine if L2 cache memory 390 contains a cache line that processor IC 221 needs. Processor IC 221 may send a snoop request over system bus 215 requesting this information. Snoop directory arbiter (SNP DIR ARB) 422 receives such a snoop request. In practice, this snoop request may originate in an RC state machine of another processor IC. System bus 215 may effectively broadcast the snoop request to all processor ICs on the system bus. If snoop directory arbiter 422 determines that L2 cache memory 390 contains the cache line requested by the snoop request, then SNP DIR ARB 422 dispatches into four snoop (SNP) state machines 403 as seen in FIG. 4. Snoop state machines 403 manage the reference and protection of requests for ownership by other caches via system bus 215. Snoop state machines 403 communicate with system bus 215, reload bus control logic 405, directory 491 and cache arbiter 420 during this process. Each of the state machines 403 may perform a different cache line task. For example, one state machine 403 may kill the cache line that the snoop request designates because the cache line changed in another processor IC. Another task that a SNP state machine 403 may perform on the cache line is to send the cache line to system memory via system bus interface 215. Yet another task that an SNP state machine 403 may perform is to send the cache line to another processor IC such as 221 the requests the cache line.

L2 cache system 213 includes a system bus arbiter (SB ARB) 430 for handling commands and a data out control (DOCTL) data arbiter 431 which acts as a data arbiter. DOCTL data arbiter 431 issues data requests to system bus 215 on behalf of cast out state machines 402 and snoop state machines 403 to move data to system bus 215. Snoop requests that L2 cache system 213 receives from system bus 215 may require two actions, namely sending a command to a snoop state machine and setting up a communication with another cache or another processor IC. SB arbiter 430 issues data requests to system bus 215 on behalf of RC state machines 401, cast out state machines 402 and snoop state machines 403.

The L2 cache memory is inclusive of the contents of the L1 cache in the processor core 210. This means that all lines in the L1 cache are also in the L2 cache memory 390. When the L2 cache system detects a change in a particular cache line, for example by detecting a store operation on system bus 215, the L2 cache system sends an "invalidate" notice (INV) to the L1 cache in the processor core to let the L1 cache know that the L1 cache must invalidate the particular cache line. FIG. 4 shows such invalidate notices as INV. Normally CPU directory arbiter 421, cache arbiter 420 and snoop directory arbiter 422 work independently to service individual requests from the busses and machines they support. But when directory arbiter 421 is dispatching a load or store to the RC machine 401, the CPU directory arbiter 421 and the cache arbiter 420 interlock such that the data reads immediately out of the L2 cache memory 390 in the case of a L2 cache hit. In this way, the CPU directory arbiter 421 and cache arbiter 420 interlock, as arbiter interlock line 423 indicates, and work in conjunction to perform given high priority task such as load and store dispatch requests.

Figure 5A:
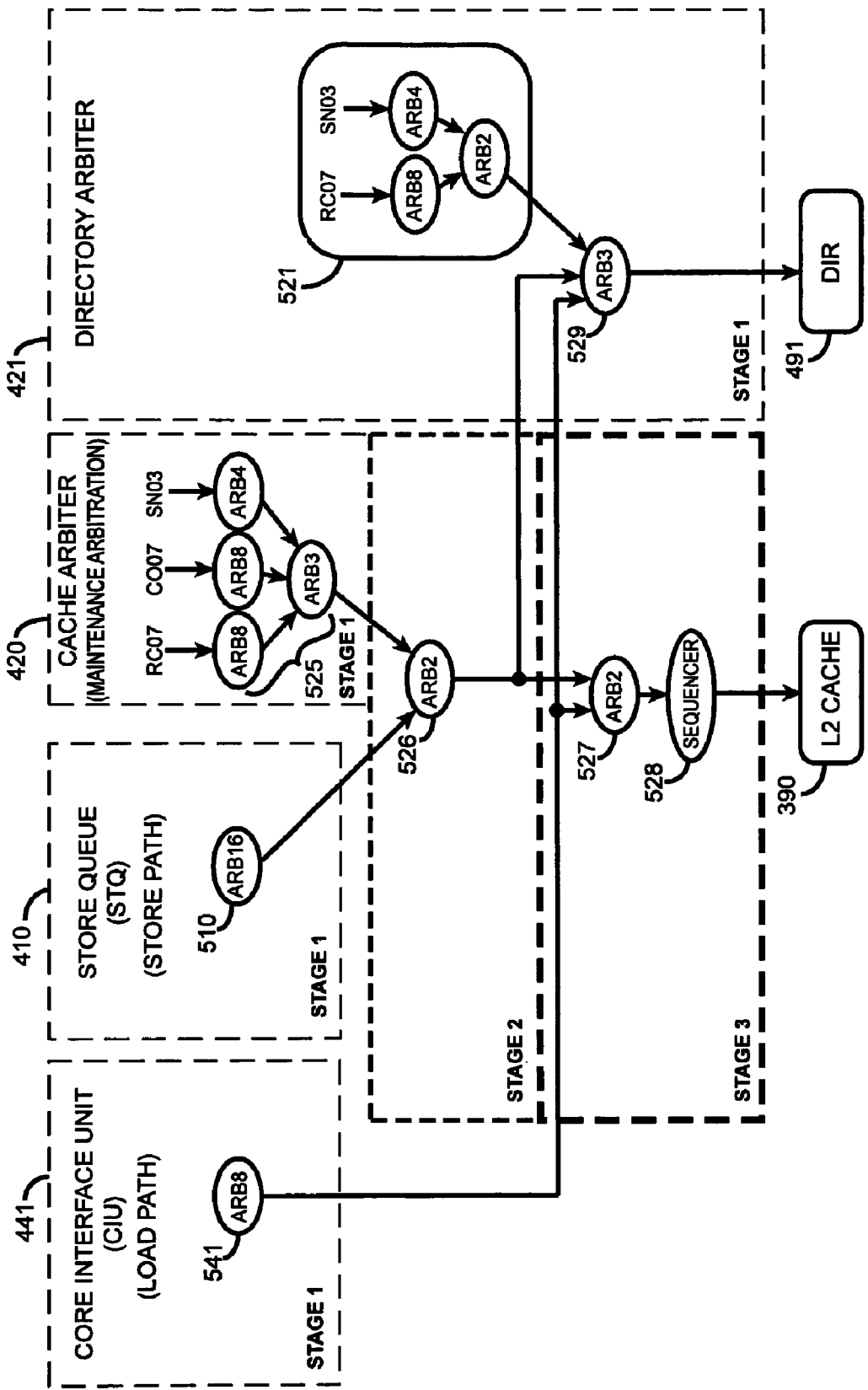
FIG. 5A is an arbitration control diagram for a first embodiment of the disclosed cache management system.

FIG. 5A is an arbitration control diagram for a first embodiment of the disclosed cache management methodology. The data flow diagram of FIG. 3A and the control flow diagram of FIG. 4 both apply to this first embodiment. The control diagram of FIG. 5A provides more detail with respect to particular arbitration aspects of the control flow diagram of FIG. 4 as L2 cache 215 conducts the disclosed cache management methodology of the first embodiment.

The first embodiment of FIG. 5A relates to an L2 store-in cache and directory control management methodology with immediate scheduling of core loads. This cache methodology achieves minimal core load latency by providing core load operations with the ability to interrupt multi-beat accesses such as store operations that are already in progress in an L2 cache. If the L2 cache commences servicing a store request operation from a processor core, the L2 cache allows a load operation from a processor core to interrupt the store operation already in process. The L2 cache immediately services the load operation. Once servicing of the load operation is complete, the L2 cache returns to handling the interrupted load request at the point of interruption of the store request.

Figure 5B:
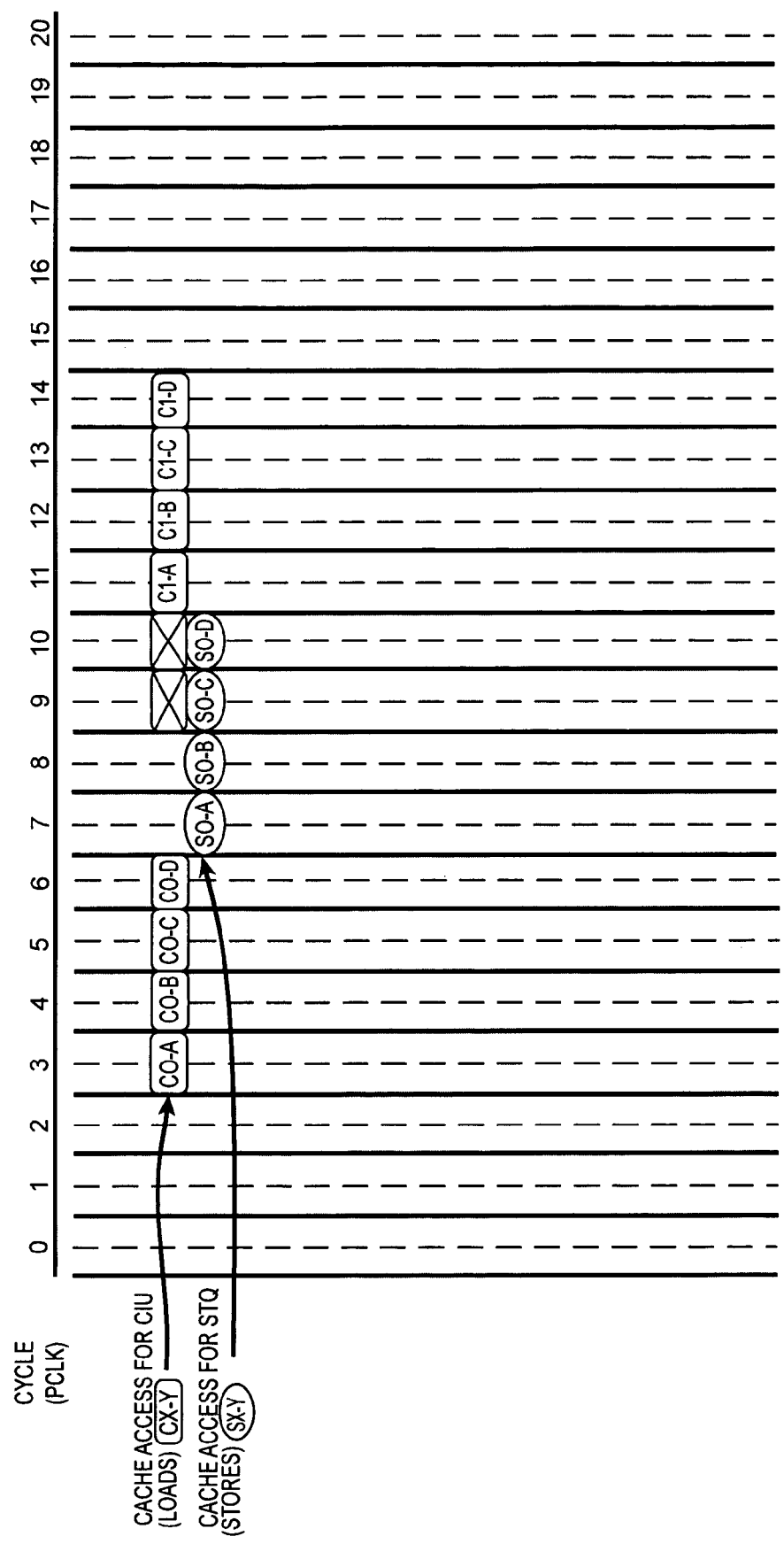
FIG. 5B is a timing diagram for one conventional cache management system.

To appreciate the operation of the first embodiment, a comparison between a timing diagram for the cache management method of the first embodiment and a timing diagram from one conventional cache management method is helpful. FIG. 5B is a timing diagram that depicts the operation of one conventional cache management method. The horizontal axis represents time, namely 20 processor clock cycles or P-clock (PCLK) cycles. Rounded rectangular boxes depict load operations that the conventional L2 cache handles, i.e. cache accesses for a core interface unit (CIU). Circles or ovals indicate store operations for a store queue, i.e. cache accesses for a store queue.

The L2 cache receives a load operation request and performs the requested load operation in cache accesses C0-A, C0-B, C0-C and C0-D during cycles 3, 4, 5 and 6 respectively. At the end of this load operation and at the request of the core, the L2 cache commences a store operation. The L2 cache performs the requested store operation in cache accesses S0-A, S0-B, S0-C and S0-D during cycles 7, 8, 9 and 10, respectively. In cycle 9, the L2 cache receives another request, namely a load request. However, the L2 cache can not service the load request because it is still working on the previous store request in cycles 9 and 10. The L2 cache waits until servicing of the store request is complete at cycle 10 and then commences servicing the load request at cycle 11. The L2 cache performs the requested load operation in cache accesses C1-A, C1-B, C1-C and C1-D during cycles 11, 12, 13 and 14, respectively. The X's in the boxes in cycles 9 and 10 represent the delay in servicing the second load request that the previous store request causes.

Figure 5C:
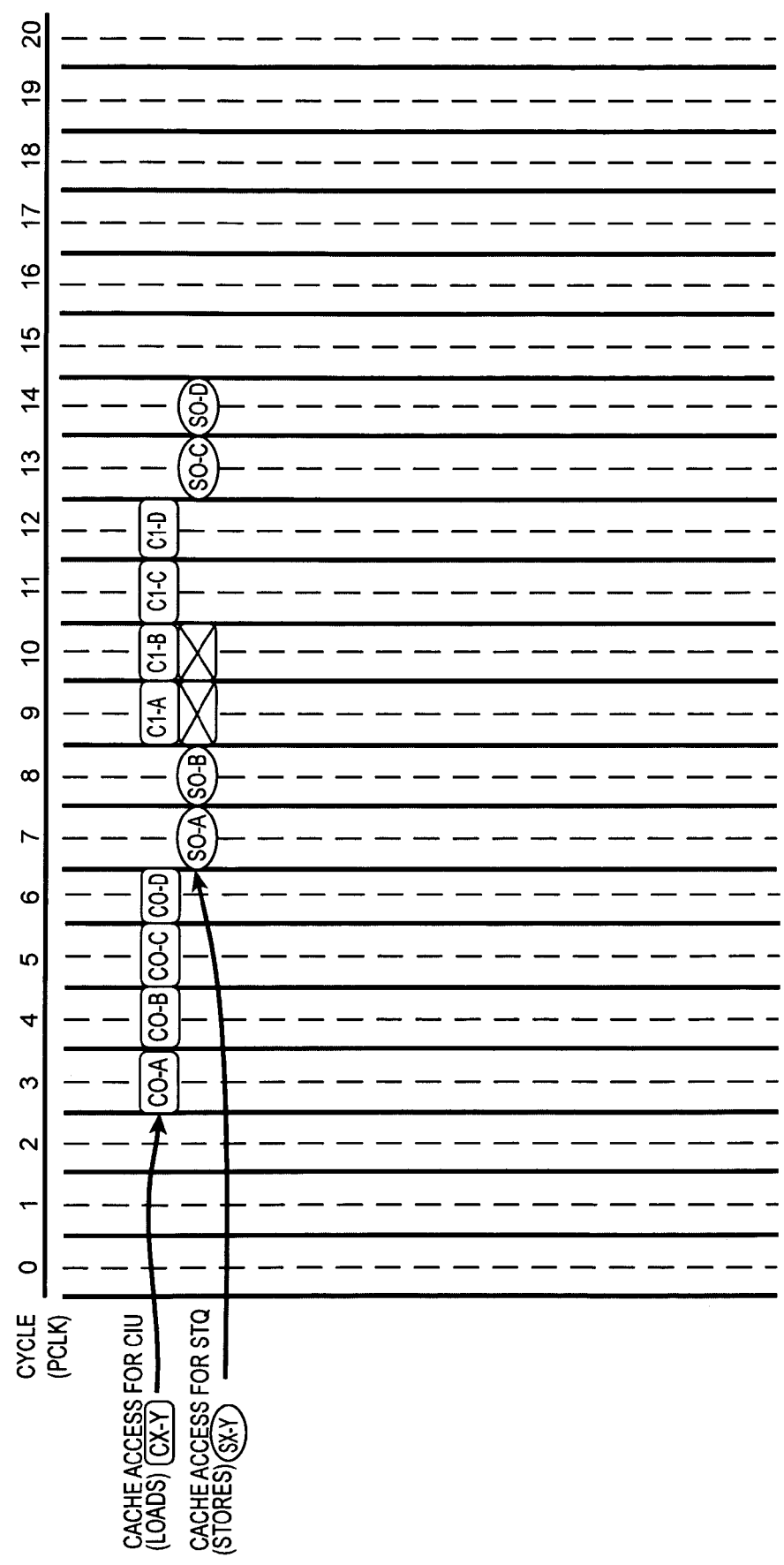
FIG. 5C is a timing diagram for the cache management system of FIG. 5A.

FIG. 5C shows a representative timing diagram for the L2 cache management methodology that the first embodiment employs. The L2 cache receives a load operation request and performs the requested load operation in cache accesses C0-A, C0-B, C0-C and C0-D during cycles 3, 4, 5 and 6 respectively. At the end of this load operation and at the request of the core, the L2 cache commences a store operation. The L2 cache performs the requested store operation in cache accesses S0-A and S0-B during cycles 7 and 8, but receives an interruption from another load request. The L2 cache interrupts the pending store operation and immediately starts servicing the load request. The L2 cache performs the requested load operation in cache accesses C1-A, C1-B, C1-C and C1-D during cycles 9, 10, 11 and 12, respectively. Once servicing of the interrupting load operation is complete at cycle 12, the L2 cache returns to servicing the interrupted store operation at the point of interruption and continues with cache accesses S0-C and S0-D to complete the store operation during cycles 13 and 14, respectively. The first embodiment of FIG. 5C thus substantially reduces load latency in comparison with the L2 cache methodology of FIG. 5B.

Returning to the arbitration control diagram of FIG. 5A, the arbitration that occurs in the first embodiment is now discussed. FIG. 5A effectively enlarges or concentrates on portions of the control flow of FIG. 4. For example, the control diagram of FIG. 5A shows more detail with respect to cache arbiter 420 and directory arbiter 421. FIG. 5A also depicts core interface unit (CIU) 441 in the load path and store queue 410 in the store path.

The purpose of FIG. 5A is to depict the arbitrations that occur to obtain access to L2 cache 390 and directory 491 shown at the bottom of FIG. 5A. One goal of these of these arbitrations is to effectively get the load and store operations from the core together in a line because single-bank L2 cache 390 can only do one operation at time. The depicted control diagram arbitrates to arrange the loads and stores in such a fashion that a load may interrupt a store operation in the L2 cache and the L2 cache may continue servicing the interrupted store at the point of interruption once the interrupting load operation completes.

RC07 is a shorthand notation for state machines RC0, RC1 . . . RC7. CO07 is a shorthand notation for cast out state machines CO-0, CO-1, . . . CO7. SN03 is a shorthand notation for snoop machines SN0, SN1, . . . SN3. When any of these RC state machines, CO state machines or snoop machines need to access L2 cache 390 or directory 491, they need to go through the stage 1, stage 2 and stage 3 arbitrations shown in FIG. 5A. Cache arbiter 420 conducts an 8 way arbitration among the 8 RC state machines RC07. The designation ARB8 in the oval adjacent RCO7 signifies this 8 way arbitration. Cache arbiter 420 also conducts an 8 way arbitration among the 8 cast out state machines CO07. Cache arbiter 420 further conducts a 4 way arbitration ARB4 among the 4 snoop state machines SN03. The result of these 3 arbitrations feeds a 3 way arbitration ARB3 as shown in cache arbiter 420 of FIG. 5A. These RC07, CO07 and SN03 arbitrations, followed by the arbitration of the 3 results of these arbitrations, are all "stage 1" arbitrations. Stage 2 arbitration follows stage 1 arbitration and stage 3 arbitration follows stage 2 arbitration as discussed below.

Store queue control logic 410 performs a 16 way arbitration (ARB16) at 510. This corresponds to an 8 way arbitration to load up store queue buffer 310 and an 8 way arbitration to unload this store queue buffer. In other words, ARB16 at 510 is actually two 8 way arbitrations. These two 8 way arbitrations are stage 1 arbitrations as shown in FIG. 5A. In this manner, L2 store queue buffer 310 receives a supply of store operations to execute or service during stage 1. Ultimately, after the 16 arbitrations at 510, a single result of this arbitration appears as one input to a 2 way arbitration (ARB2) at 526 in a stage 2. The other input to this 2 way arbitration (ARB2) is the result of the earlier 3 way arbitration in cache arbiter 420. The result of this two way arbitration in stage 2 becomes one input of a 2 way arbitration (ARB2) at 527 in a stage 3 that follows stage 2, as shown. Also during stage 1, core interface unit control logic 441 conducts an 8 way arbitration (ARB8) at 541 to determine the load instruction that should proceed to the next stage. The remaining input of this 2 way arbitration 527 receives the load request result of the 8 way arbitration that CIU control 441 conducted. The output of the two way arbitration (ARB2) at 527 supplies arbitration results to sequencer 528. These results include load requests, store requests and other requests.

In summary, many requests contend for access to the L2 cache 390. These contending requests includes load requests from CIU control 441, store requests from store queue control 410, as well as requests from the RC state machines RC07, the cast out state machines CO07 and the snoop request state machines SN03. The arbiters process these requests in parallel to pick a winner to go to a subsequent stage. The stage 2 arbitration encompasses all of the state machines listed above. The stage 3 arbitration is the final arbitration that selects the current request for the L2 cache to process.

The control diagram of FIG. 5A also shows contention for directory 491 by core interface unit 441 (for loads), store queue 410 (for stores) and the RC state machines RC01, the cast out machines CO07 and the snoop state machines SN03. Read claim machines RC07 go to directory arbiter 421 to do writes to directory 491. FIG. 5A shows a blow-up of directory arbiter 421. Directory arbiter 421 includes an arbitration 521 with an 8 way arbitration (ARB8) for RC machines RC07 and a 4 way (ARB4) arbitration for the snoop state machines SN03. This occurs because both the RC machines RC07 and the snoop machines SN03 may desire to perform an update of directory 491. A two way arbitration (ARB2) arbitrates between the result of the 8 way arbitration (ARB8) for the RC state machines and the result of the 4 way arbitration (ARB4) for the snoop machines, as seen in FIG. 5A. The result of this arbitration (ARB2) goes to a 3 way arbitration (ARB3) at 529. The result of the 8 way arbitration (ARB8) at 541 in core interface unit control logic 441 goes to the 3 way arbitration (ARB3) at 529 for directory 491. This accounts for 2 of the 3 inputs to 3 way arbitration (ARB3) at 529. The result of the two way arbitration (ARB2) at 526, discussed above, provides the third input to the 3 way arbitration (ARB3) at 529. The winner of the 3 way arbitration (ARB3) at 529 receives access to directory 491. Loads from CIU control logic 441 in the load path receive immediate access to directory 491 without any intervening arbitrations, except for the 3 way arbitration (ARB3) at 529. A load operation will win the 3 way (ARB3) arbitration at 529 and receive immediate access to the directory 429 ahead of the requests from competing requesters such as RC state machines, cast out state machines, snoop state machines and store queue 410.

In the control diagram of FIG. 5A, loads exhibit a lower latency that stores. Loads from the 8 way arbitration (ARB8) at 541 from stage 1 go directly to the 2 way arbitration (ARB2) at 527 in stage 3, thus bypassing stage 2 arbitration. A load at the 2 way arbitration (ARB2) at 527 prevails over a competing store or other request. Such a load request passes immediately from stage 3 to L2 cache 390 for expedited servicing, thus taking precedent over any currently executing store operation. A load request will thus interrupt a currently executing store operation. When the interrupting load operation completes, the L2 cache will continue processing the interrupted store operation from the point of interruption.

Figure 5D:
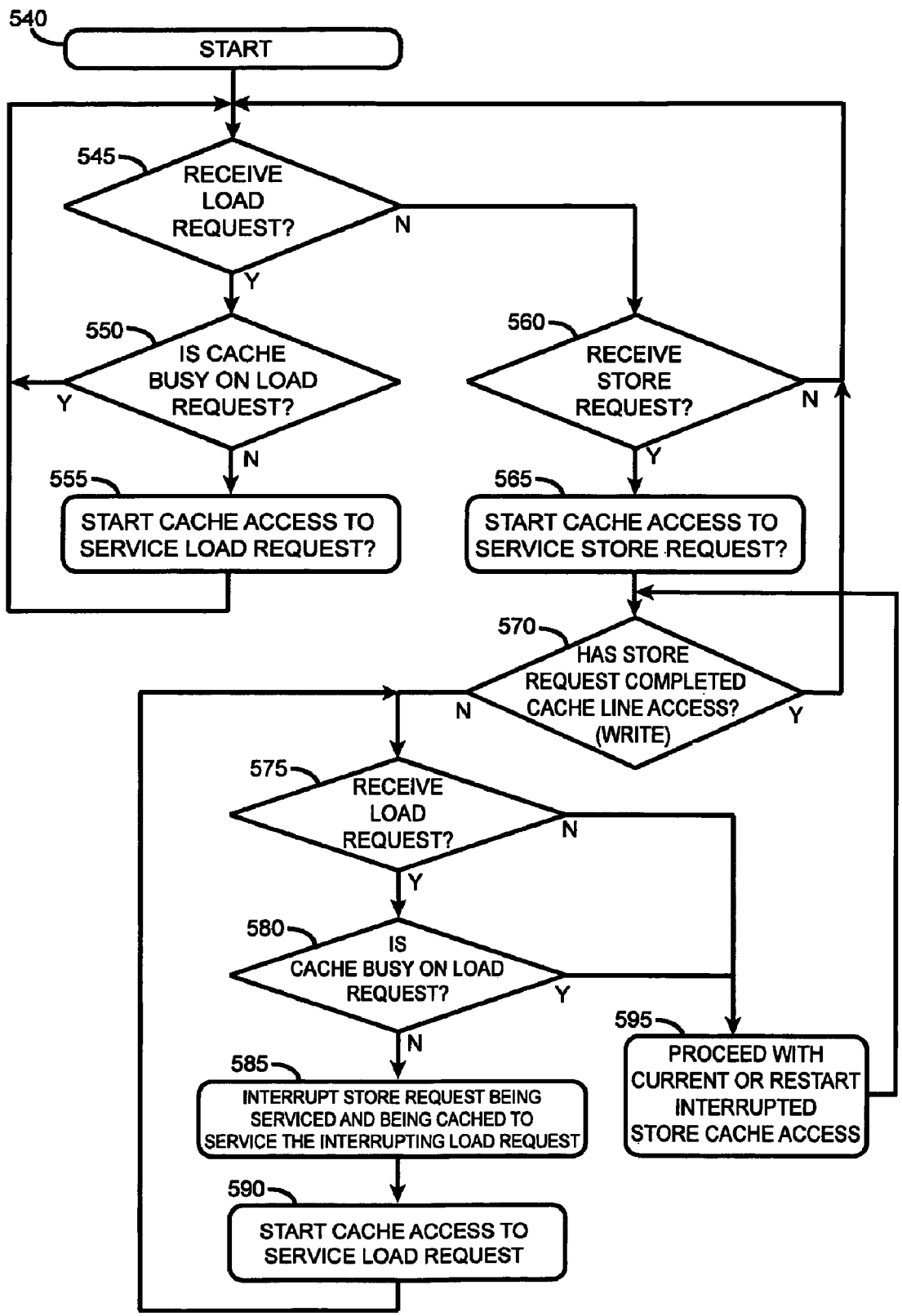
FIG. 5D is a flowchart for the cache management system of FIG. 5A.

FIG. 5D is a high level flowchart that depicts process flow in the first embodiment of the disclosed L2 cache management methodology. Process flow commences at start block 540. L2 cache system 213 receives load and store requests from core 210. L2 cache system 213 performs a test to determine if a particular request that it receives is a load request, as per decision block 545. If the particular request is a load request, then L2 cache system performs another test to determine if the L2 cache is currently busy on another load request, as per decision block 550. If this test determines that the L2 cache is currently busy handling another load request, then L2 cache system 213 keeps recycling test block 545 and test block 550 until test block 550 determines that the L2 cache is no longer busy handling another load request. When the L2 cache is no longer busy handling another load request, then the L2 cache starts an L2 cache access to service the load request, as per block 555. In this first embodiment, load requests receive priority over store request with respect to accessing the L2 cache memory 390. In L2 cache system 213, load requests receive priority handling over store requests. Moreover, load requests may interrupt store request accesses that are already underway. After servicing an interrupting load request, L2 cache system 213 may return to servicing the interrupted store request at the point of interruption of the store request.

If the test at decision block 545 determines that the particular request is not a load request, then L2 cache system 213 tests to determine if the particular request is a store request, as per decision block 560. If the particular request is not a store request, then process flow continues back to the load request test at decision block 545. However, if the particular request is a store request, then L2 cache system 213 starts an L2 cache memory access to service the store request, as per block 565. L2 cache system 213 then conducts a test to determine if the store request completed a cache line access, namely a store or write operation, as per block 570. If the store request completed a cache line read, then process flow continues back to decision block 545 to monitor for more incoming load requests. However, if the store request did not yet complete a cache line read to completely fulfill the request, then L2 cache system 213 conducts a test to determine if L2 cache system 213 now receives a load request for access to cache memory 390, as per block 575. If the received request is a load request, then the L2 cache system 213 conducts a further test to determine if the cache memory 390 is busy with another load request access, as per block 580. If the L2 cache system is not already busy servicing another load request, then the L2 cache system is currently servicing a store request. L2 cache system 213 interrupts the servicing of this store request and commences servicing the received load request instead, as per block 585. In this scenario, the load request is an interrupting load request and the store request is an interrupted store request. L2 cache system 213 starts an L2 cache memory access to service the interrupting load request, as per block 590.

If the test at decision block 575 determines that the current request received is not a load request, then L2 cache memory system 213 proceeds with the current store cache access or restarts the interrupted store cache access at the point of interruption, as per block 595. If the test at decision block 580 determines that the L2 cache is currently busy handling a load request, then L2 cache memory system 213 proceeds with servicing the current load request, as per block 595.

In this first embodiment, a load or store operation that needs the L2 cache may consume four (4) beats or cycles (PCLKs). Other embodiments are possible where a load or store operation may consume a different number of beats. Control logic in the L2 cache system may interrupt a store operation on any one of the 4 beats, i.e. a variable number of beats or cycles depending on the particular application. For example, if a load operation reaches the L2 cache system at the second beat of a store operation, the L2 cache system may interrupt the store operation in progress and immediately start servicing the interrupting load operation at the second beat. Later, after completion of servicing the interrupting load operation, the L2 cache may return to service the remaining 3 beats of the interrupted store operation.

Figure 6A:
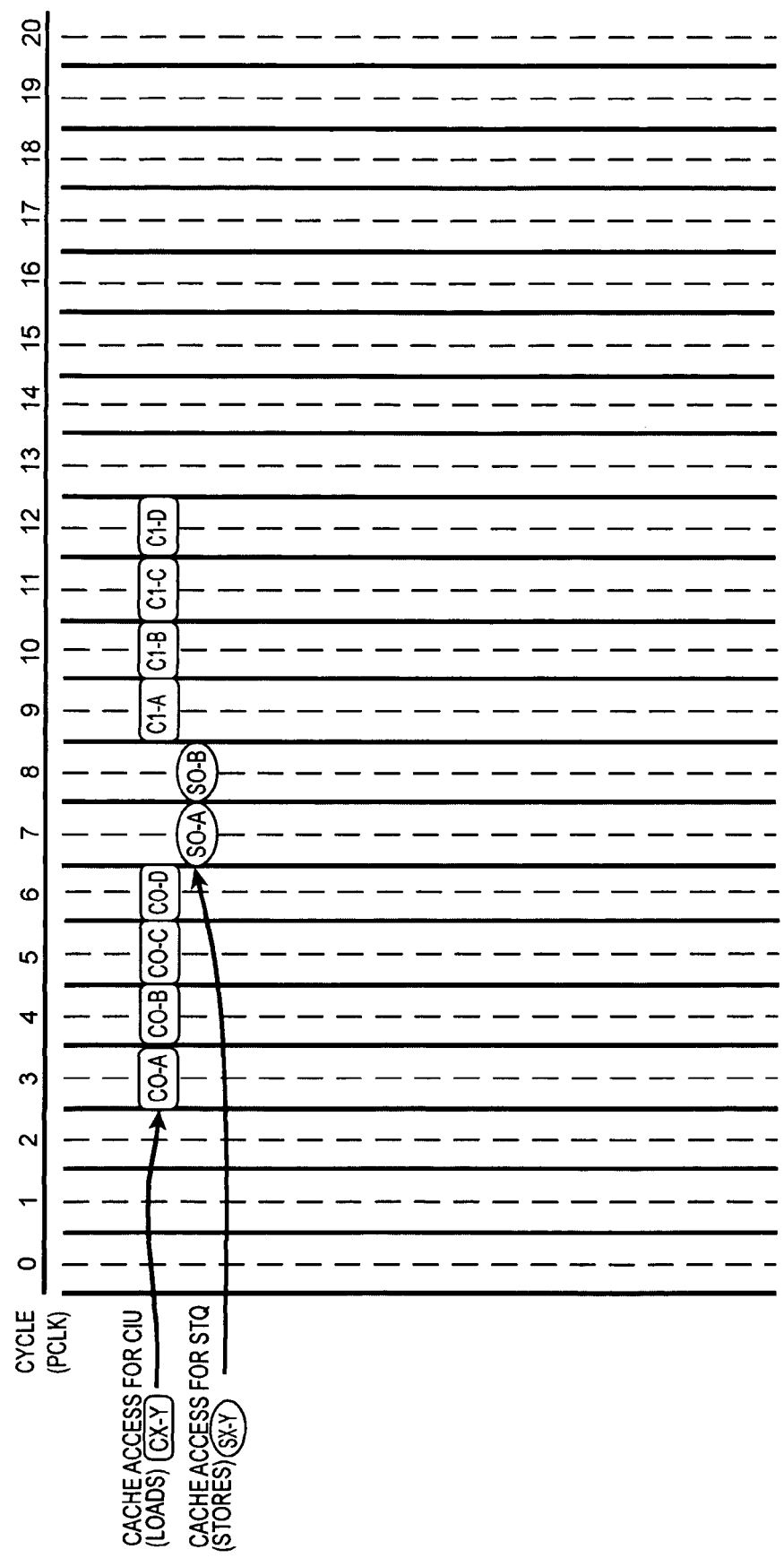
FIG. 6A is a timing diagram for a second embodiment of the disclosed cache management system.

FIG. 6A depicts a timing diagram for a second embodiment of the disclosed cache management methodology. The second embodiment exhibits a number of similarities to the first embodiment. Like the first embodiment, the second embodiment is a cache methodology that achieves minimal core load latency by providing core load operations with the ability to interrupt multi-beat accesses such as store operations that are already in progress in a single-bank L2 cache. However, in the second embodiment, the disclosed cache management methodology provides a store operation with fine-grained access size to the L2 cache. Because store requests from the core in many benchmarks involve less than a full cache line, there is a performance and power benefit to allowing stores to only access the cache specifically for the bytes and cycles that the store request actually needs rather than accessing and reading out the entire cache line. This may reduce power consumption by limiting the number of L2 cache cycles that a store operation consumes. This may also provide an increased effective bandwidth for important load accesses by the core.

The second embodiment employs substantially the same arbitration mechanism that arbitration control diagram FIG. 5A depicts. Not all store operations from the core are 128 bytes, i.e. the cache line size. For example, the core may send a single 4 byte store operation request to the L2 cache system that the L2 cache system may merge into a 128 B cache line. However, performance increases if the L2 cache limits stores to accessing the L2 cache memory for the particular bytes and cycles that the store request actually needs, rather than the entire cache line.

FIG. 6A is a timing diagram that illustrates the operation of the L2 cache system of the second embodiment. The L2 cache receives a load operation request and performs the requested load operation in cache accesses C0-A, C0-B, C0-C and C0-D during cycles 3, 4, 5 and 6 respectively. At the end of this load operation and at the request of the core, the L2 cache commences a store operation. However, this store operation does not consume an entire 128 B cache line and just requires 2 beats of processor clock (PCLK) cycles to complete. The L2 cache system, or more specifically the store queue control 410 of FIG. 4 (or 510 of FIG. 5A), tracks the size requirements of this store request such that sequencer 528 of FIG. 5A knows that this particular store operation needs just 2 beats, i.e. a reduced number of beats in comparison to what another store request may need. The size requirement of a particular store operation corresponds to the size in terms of the number of beats or cycles of L2 cache memory that the particular store operation requires. Stated alternatively, the size requirement of a particular store operation corresponds to the size in terms of the minimum number of bytes from a cache line that the store operation requires to access. The size requirement may thus be a minimum size requirement. The L2 cache performs the requested store operation in cache accesses SO-A and SO-B during cycles 7 and 8. The L2 cache access for this store operation is now complete and the L2 cache is ready for another load or store operation. At the end of this short store operation, the L2 cache system receives another load operation request. The L2 cache system performs the requested load operation in cache accesses C1-A, C1-B, C1-C and C1-D during cycles 9, 10, 11 and 12, respectively. The L2 cache is then available for servicing other requests.

Figure 6B:
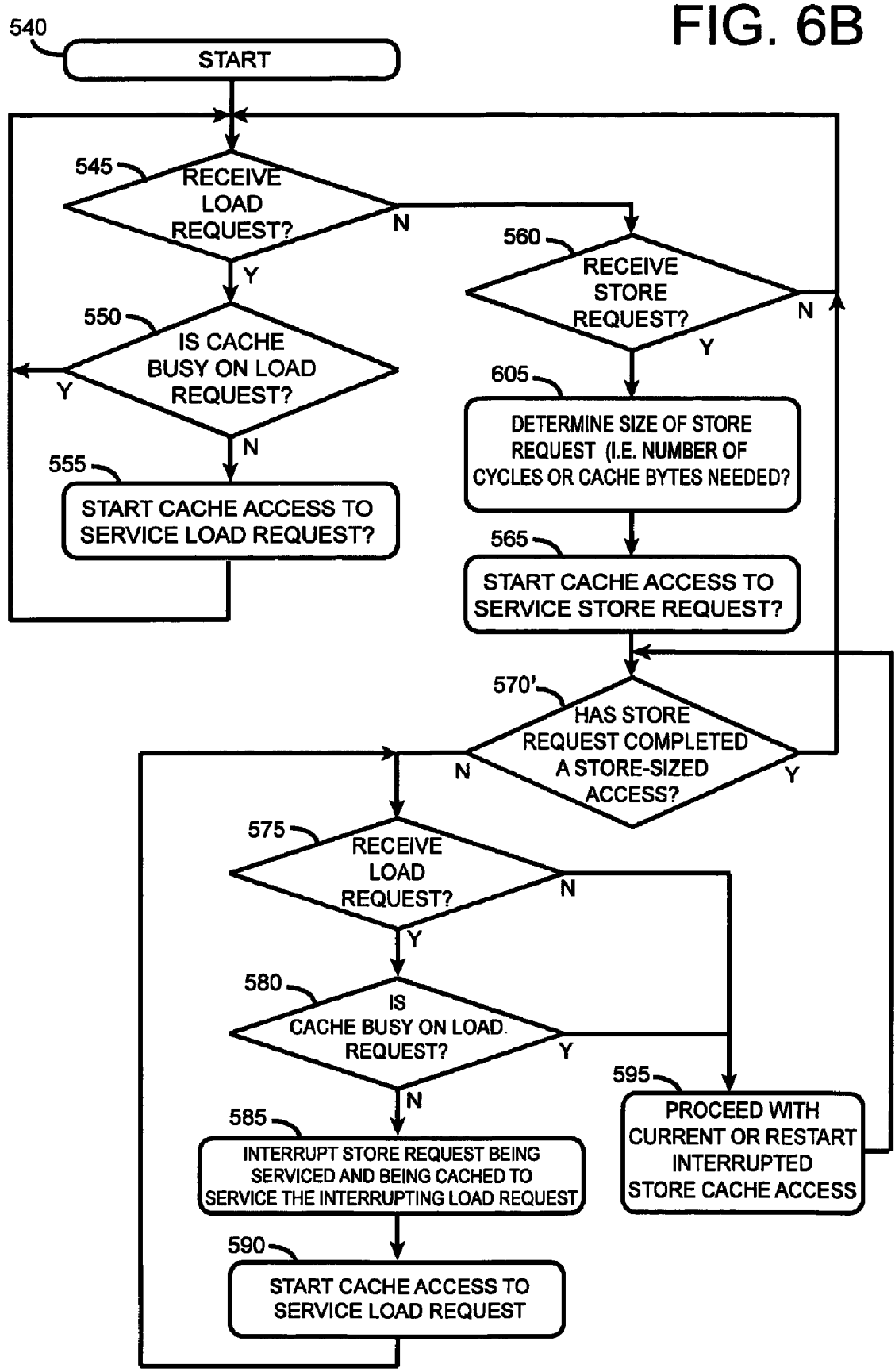
FIG. 6B is a flowchart for the second embodiment of the disclosed cache management system.

FIG. 6B is a high level flowchart that depicts process flow in the second embodiment of the disclosed L2 cache management methodology. The flowchart of FIG. 6B exhibits many similarities to the flowchart of FIG. 5D discussed above. Like numbers indicate like steps when comparing the flowcharts of FIG. 6B and FIG. 5D. One difference in the flowchart of FIG. 6B is that after L2 cache management system 213 tests and determines that the currently received request is a store request at decision block 560, the L2 cache management system 213 determines the size of the store request, as per block 605. In other words, system 213 determines the number of beats or the number of bytes that a particular store request requires to obtain the data it needs. This number of beats or bytes may be less than the number of beats or bytes that correspond to an entire cache line.

L2 cache management system 213 begins a cache access to execute the store request, as per block 565. System 213 conducts a test to determine if the system completed a store-sized write operation, as per decision block 570'. In other words, decision block 570' determines if the store request already wrote to the portion of the L2 cache line that it needs to execute as opposed to accessing the entire cache line. If decision block 570 finds this to be true, then process flow continues back to decision block 545 where monitoring for load requests begins again. This action speeds up the processing of store requests because cache management system 213 does not access the entire cache line when it executes a store operation, but rather accesses the portion of the cache line that it needs.

If L2 cache management system 213 determines at decision block 570' that the store request did not complete a store-sized read access, then system 213 continues accessing cache memory 390 for the store request. System 213 tests to see if an incoming request is a load request at decision block 575. If a received request it is load request and the L2 cache is not busy on another load request, then L2 cache system 213 interrupts the store request being serviced and starts servicing the interrupting load request, as per block 585. System 213 starts a cache memory 390 access to service the interrupting load request on cache bank load needs, as per block 590'. Flow then continues back to receive load request decision block 575 and the process continues.

The cache and directory arbitration control diagram of FIG. 5A applies to this second embodiment of FIGS. 6A-6B. The second embodiment employs substantially the same arbitration mechanism that arbitration control diagram FIG. 5A depicts. As discussed above, some store operations may require substantially fewer bytes than an entire 128 byte long cache line. Store queue control logic 410 determines and tracks the number of cycles or beats that each store request will take to perform by the L2 cache system 213. Store queue control logic 410 of FIG. 5A in cooperation with L2 store queue buffer 310 of FIG. 3A performs this tracking and determination of store time requirements. Store queue buffer 310 gathers store operations and packs them together for forwarding to the L2 cache system for handling and completion. The arbitration operations of FIG. 5A determine which store operation and which load operation the L2 cache may currently service while implementing the disclosed methodology that FIGS. 6A and 6B depict. These arbitration operations ultimately feed into the sequencer 528 that controls the sequence of operations that the L2 cache system feeds to the L2 cache memory for execution.

In summary, in the second embodiment, if the L2 cache system accesses the L2 cache memory on behalf of a store operation that requires fewer cycles or PCLKs than a predetermined maximum number of cycles, the store operation ceases after the required cycles complete rather than continuing up to the maximum number of cycles. In this manner, store operations may finish more quickly and while staying out of the way of more important load operations. The L2 cache mechanism accesses just those bytes that it needs to carry out the requested store operation rather than accessing more bytes than needed and consuming more cycles than required.

The third embodiment employs the dual bank cache architecture that FIG. 3B depicts. FIG. 3B is similar to FIG. 3A except for the dual bank L2 cache 390' architecture that FIG.

Figure 7A:
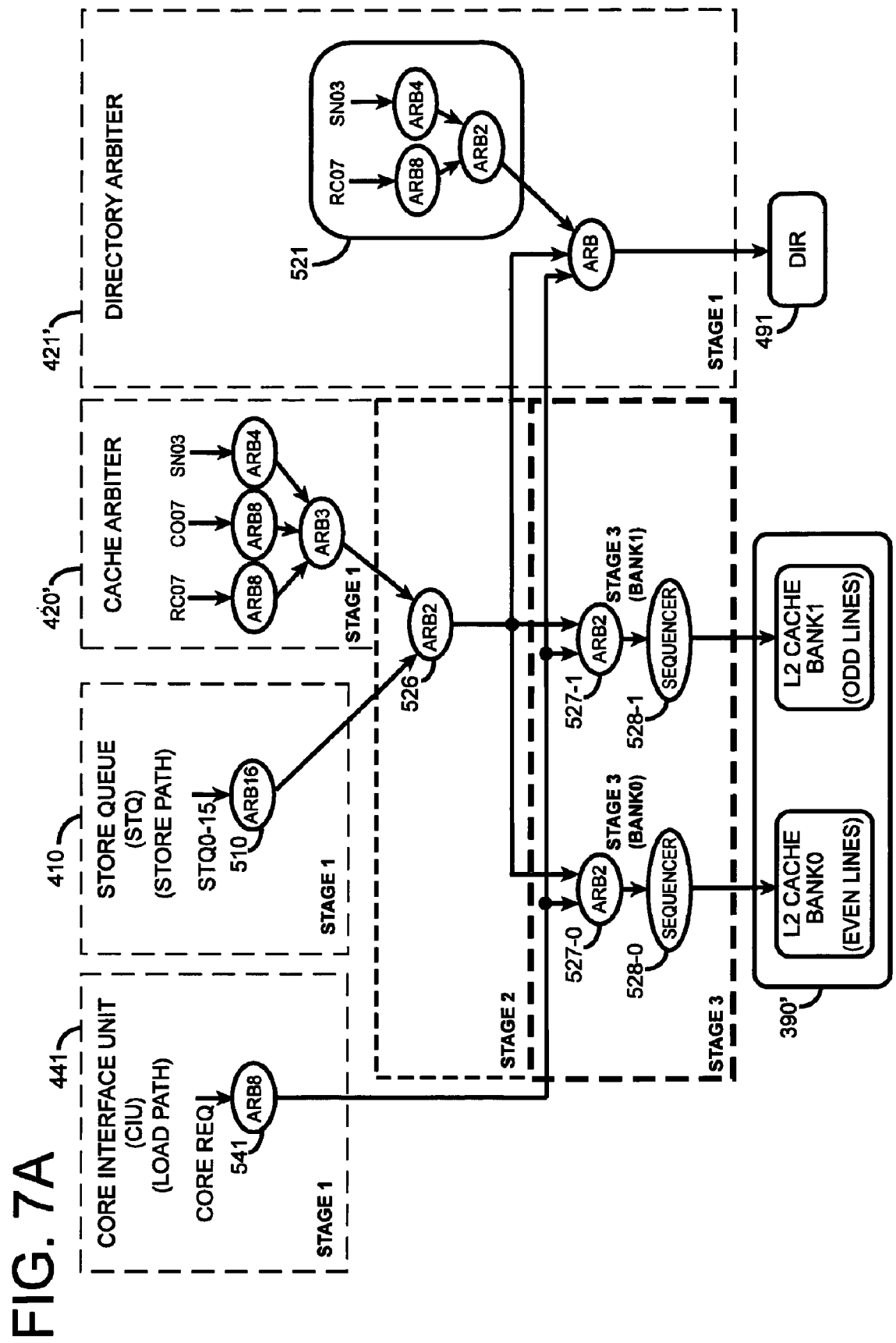
FIG. 7A is an arbitration control diagram for a third embodiment of the cache management system.
Figure 7B:
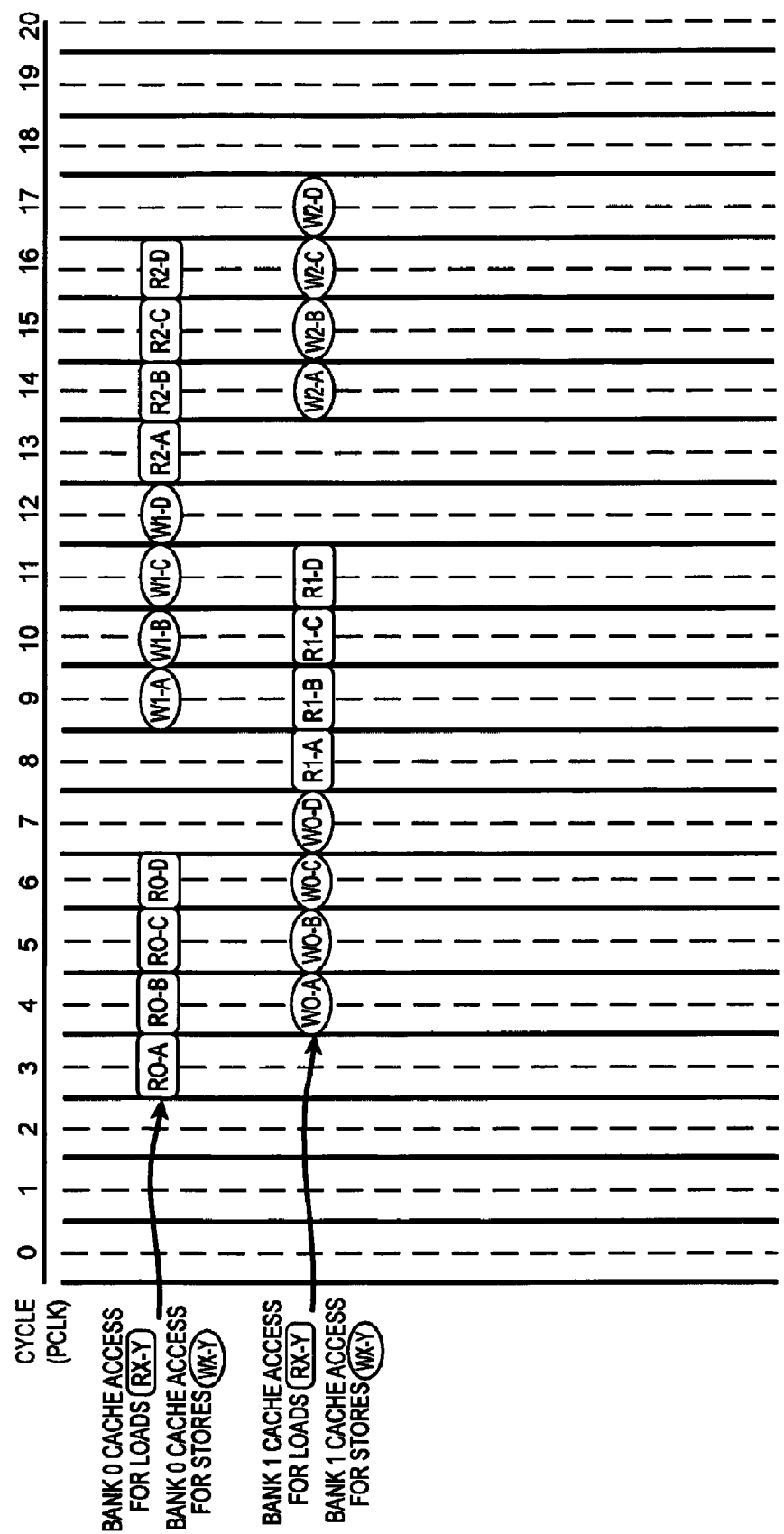
FIG. 7B is a timing diagram for the third embodiment of the cache management system.

3B employs and the arbitration control mechanism of FIG. 7B. As discussed above, L2 cache memory 390' includes 2 banks of high speed cache memory, namely BANK0 and BANK1, and a single directory 491. BANK0 stores even cache lines while BANK1 stores odd cache lines. Multiplexer 395 can select either an even cache line from BANK0 or an odd cache line from BANK1 of L2 cache memory 390'.

Figure 8A:
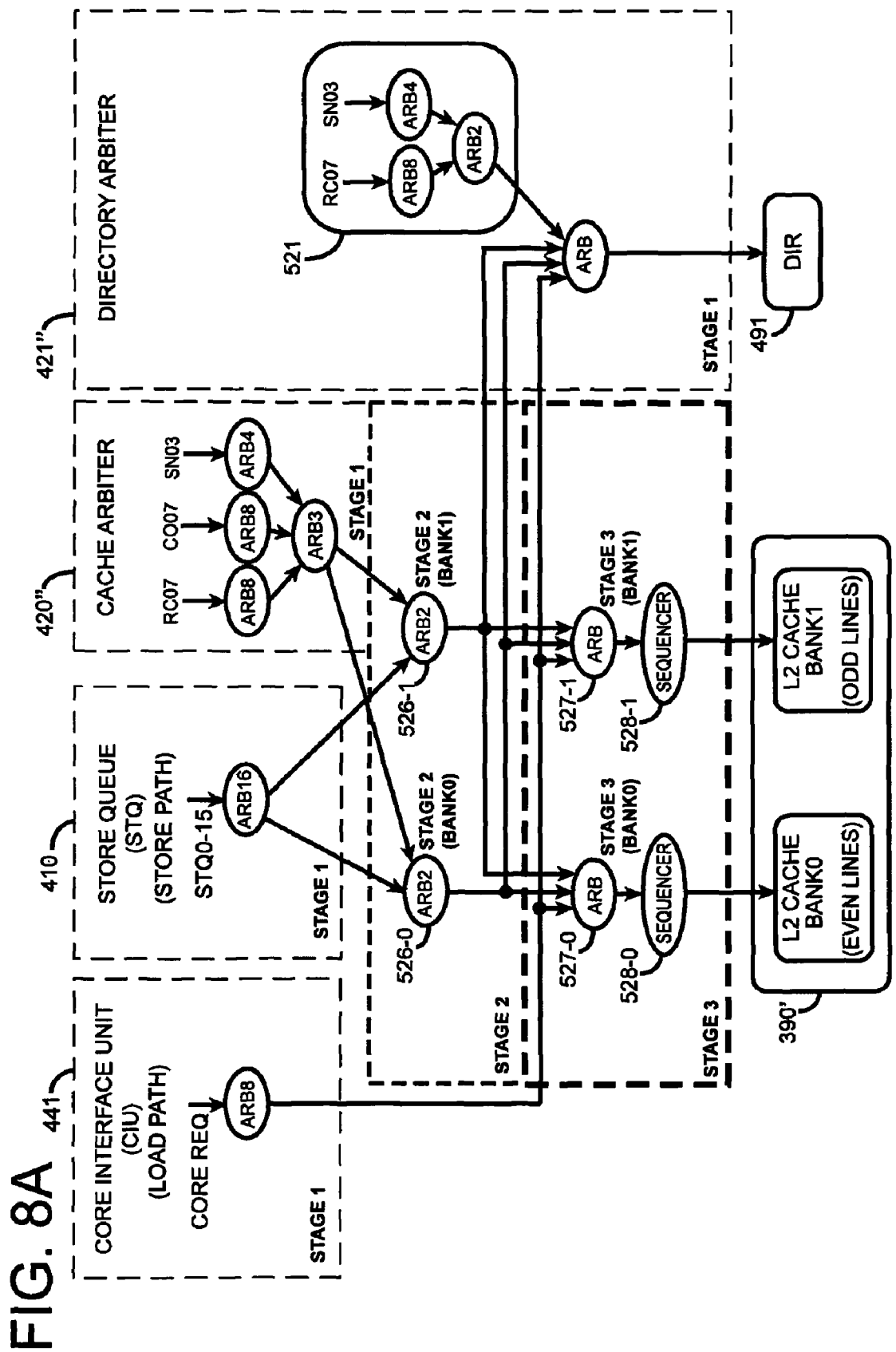
FIG. 8A is an arbitration control diagram for the fourth embodiment of the cache management system.

The third embodiment employs dual data interleaving in BANK0 and BANK1 of L2 cache memory 390'. The arbitration control mechanism of FIG. 7B may access BANK0 for a read operation at substantially the same time that the mechanism accesses BANK1 for a write operation. This provides increased bandwidth into and out of the L2 cache. The arbitration control mechanism may also access BANK0 for a write operation at substantially the same time that the mechanism accesses BANK1 for a read operation. In other words, the arbitration control mechanism and dual cache bank architecture enables concurrent write to one cache bank while reading from the other cache bank. While the third embodiment does provide for reading and writing from the dual bank L2 cache memory 390' at substantially the same time, the read and write operations may not commence at the same time. For example, writing to one bank may begin one cycle or beat after reading begins from the other bank. However, the later discussed fourth embodiment of FIG. 8A provides a dual bank L2 cache wherein read and write operations to the two L2 cache banks may begin at the same time.

Comparing the arbitration control mechanism of FIG. 5A with the arbitration control mechanism of FIG. 7A, the arbitration control mechanism of FIG. 7A is similar to the mechanism of FIG. 5A, except that the mechanism of FIG. 7B includes two stage 3 arbitrations that control access to two banks of cache, namely BANK0 and BANK1. More specifically, stage 3 of FIG. 7B arbitration mechanism includes a two way arbiter (ARB2) 527-1 and a two way arbiter (ARB2) 527-1 that respectively feed arbitration results to sequencer 5128-0 and sequencer 528-1. Thus, stage 3 includes two parallel arbiters, namely arbiters 527-0 and 527-1, each having a dedicated sequencer, namely sequencers 528-0 and 528-1, respectively. Sequencers 528-0 and 528-1 each supply load and store requests to L2 cache BANK0 and L2 cache BANK1, as shown.

Again comparing the arbitration control mechanism of FIG. 7A with that of FIG. 5A, the stage 3 arbitration mechanism of FIG. 7A replicates the stage 3 arbitration mechanism as two cache banks (BANK0 and BANK1), two sequencers 528-0 and 528-1, and two ARB2 arbiters 527-0 and 527-1, as shown. This increases the effective bandwidth of the L2 cache memory 390'. The arbitration mechanism of FIG. 7A provides for the expedited handling of load operations to the L2 cache. The arbitration mechanism of FIG. 7A provides a single dispatch point, namely arbiter ARB 526, in the second stage to feed the load operation and store operation data flow into the dual cache banks BANK0 and BANK1 via stage 3. As seen in FIG. 7A, the stage 1 arbiter 541 for load operation includes a direct path to both stage 3 arbiters 527-0 and 527-1. In this manner, the load operation that arbiter 541 selects in stage 1 may effectively bypass and interrupt a store operation that stage 3 sends to dual cache banks BANK0 and BANK1 for servicing.

FIG. 7B shows a timing diagram that depicts the operation of the dual bank L2 cache of FIG. 7A and FIG. 3B. While stage 3 includes dual arbiters 527-0 and 527-1, stage 2 includes a single arbiter 526. In this arrangement, in a particular cycle, the L2 cache system 213 may commence a sequence of loads or a sequence of stores, but both sequences do not start at the same time, i.e. start during the same cache cycle or beat. For example, as seen in FIG. 7B, the L2 cache system 213 receives a load request and, in response, performs the requested load operation in cache accesses RO-A, RO-B, RO-C and RO-D during cycles 3, 4, 5 and 6 respectively, as read operations to BANK0. The L2 cache system 213 receives a store request and, in response, performs the requested write operation during cache accesses WO-A, WO-B, WO-C and WO-D to the other bank of the L2 cache, namely BANK1. These writes commence in cycle 4 which is one cycle after the sequence of reads start in cycle 3 to service the previous load request. The write operations occur during cycle 4, 5, 6 and 7, to service the store request.

Following the completion of write operation WO-D at cycle 6, L2 cache system 213 receives a load request and, in response, performs the requested load operation in cache accesses R1-A, R1-B, R1-C and R1-D during cycles 8, 9, 10 and 11, as read operations to BANK1. Once cycle after this read sequence begins in BANK1, L2 cache system 213 responds to a store request and performs the requested store operation in cache accesses W1-A, W1-B, W1-C and W1-D during cycles 9, 10, 11 and 12, respectively, as writes to BANK0.

Following the completion of write operation W1-D at cycle 12, L2 cache system 213 receives a load request and, in response, performs the requested load operation in cache accesses R2-A, R2-B, R2-C and R2-D during cycles 13, 14, 15 and 16, as read operations to BANK0. Once cycle after this read sequence begins in BANK0, L2 cache system 213 responds to a store request and performs the requested store operation in cache accesses W2-A, W2-B, W2-C and W2-D during cycles 14, 15, 16 and 17, respectively, as writes to BANK1. The performance of load/read operations and store/write operations thus alternates between BANK0 and BANK1 of L2 cache memory 390'.

Figure 7C:
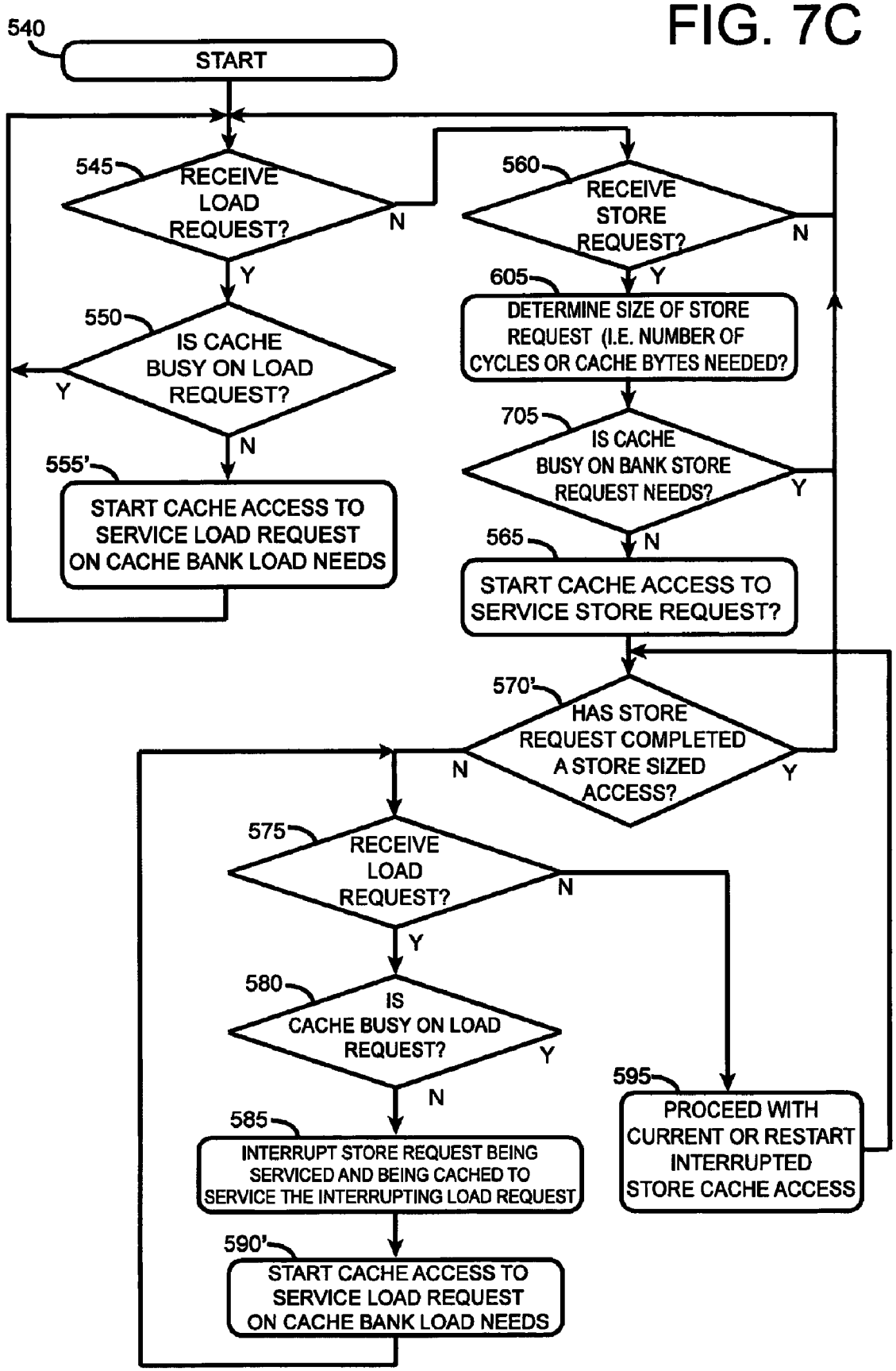
FIG. 7C is a flowchart for the third embodiment of the cache management system.

FIG. 7C is a high level flowchart that depicts process flow in the third embodiment of the disclosed L2 cache management methodology. The flowchart of FIG. 7C exhibits many similarities to the flowchart of FIG. 6B discussed above. One difference in the flowchart of FIG. 7C is that after L2 cache management system 213 finds a load request at decision block 545 and determines that the L2 cache memory 390' is not busy servicing a load request at decision block 550, then system 213 begins a cache access to service the load request on cache bank load needs, as per block 555'. In other words, cache management system 213 need not access both banks to retrieve the cache line, but rather accesses the bank in L2 cache memory 390' that it needs to access to perform the cache line load. System 213 then continues monitoring for more load requests at decision block 545.

System 213 performs a test to determine if a request is a store request at decision block 560. If the request is a store request, then system 213 determines the size of the store request, i.e. the number of cycles or cache bytes that the store request needs to access in the cache line in order to execute the store request, as per block 605, as opposed to writing the entire cache line. After determining the size of a store request, cache system 213 determines if the cache is busy on a previous load or store request access that is still yet to complete and is for the same bank this store request needs, as per decision block 705. If cache system 213 finds the cache not to be busy, then system 213 starts a cache access to service the store request. Process flow then continues in the same manner as the second embodiment of the FIG. 6B flowchart, except that at block 590' system 213 starts a cache access to service a load request on cache bank load needs.

The method that the FIG. 7C flowchart depicts provides cache access to BANK0 to service a cache read operation at substantially the same time that it provides access to BANK1 to service a cache write operation. While these read and write operations substantially overlap in time, they do not start on the same L2 cache cycle. There is a one cycle delay from the time that one cache bank begins an access in response to a request to the time that the other cache bank begins an access in response to another request. This results is two dead cycles during which a particular cache bank does not service a request, for example dead cycles 7 and 8 for cache BANK0 and dead cycles 12 and 13 for cache BANK1 in the FIG. 7B timing diagram.

The fourth embodiment employs the dual bank cache architecture that FIG. 3B depicts. FIG. 3B is similar to FIG. 3A except for the dual bank L2 cache 390' architecture that FIG. 3B employs and the arbitration control mechanism of FIG. 8A. As discussed above, L2 cache memory 390' includes 2 banks of high speed cache memory, namely BANK0 and BANK1, and a single directory 491. BANK0 stores even cache lines while BANK1 stores odd cache lines. Multiplexer 395 can select either an even cache line from BANK0 or an odd cache line from BANK1 of L2 cache memory 390'.

Like the third embodiment, the fourth embodiment discussed below employs dual data interleaving in BANK0 and BANK1 of L2 cache memory 390'. However, in the fourth embodiment, the arbitration mechanism of FIG. 8A may commence an access to BANK0 for a read operation at the same time that the arbitration mechanism accesses BANK1 for a write operation, and vice versa. This further increases the bandwidth into and out of the L2 cache beyond what the third embodiment provides. In the fourth embodiment, both cache banks may not only simultaneously execute read and write requests respectively, but they may also start executing the read and write requests simultaneously, i.e. in the same L2 cache access cycle, as seen in the timing diagram of FIG. 8B.

FIG. 8A shows the arbitration control mechanism for the fourth embodiment of the disclosed L2 cache system. Comparing the arbitration control mechanism of FIG. 8A with the arbitration control mechanism of FIG. 7A, the arbitration control mechanism of FIG. 8A is similar to the mechanism of FIG. 7A, except that the mechanism of FIG. 8A includes two stage 2 arbiters (526-0, 526-1) that control access to the two stage 3 arbiters (527-0, 527-1). Replicating the stage 2 arbiter in this manner enables the stage 2 arbiters to select from all of the state machines that contend for the even cache lines of BANK0 and all of the state machines that content for the odd cache lines of BANK1. Arbiters 526-0 and 526-1 may then cause sequencers 528-0 and 528-1 to start L2 cache accesses to BANK0 and BANK1 at the same time. This enables full utilization of cache banks BANK0 and BANK1 without dead cycles. The arbitration mechanism of FIG. 8A provides dual dispatch points, namely arbiters 526-0, 526-1 in the second stage to feed the read operation and write operation data flow into the dual cache banks BANK0 and BANK1 via stage 3.

Figure 8B:
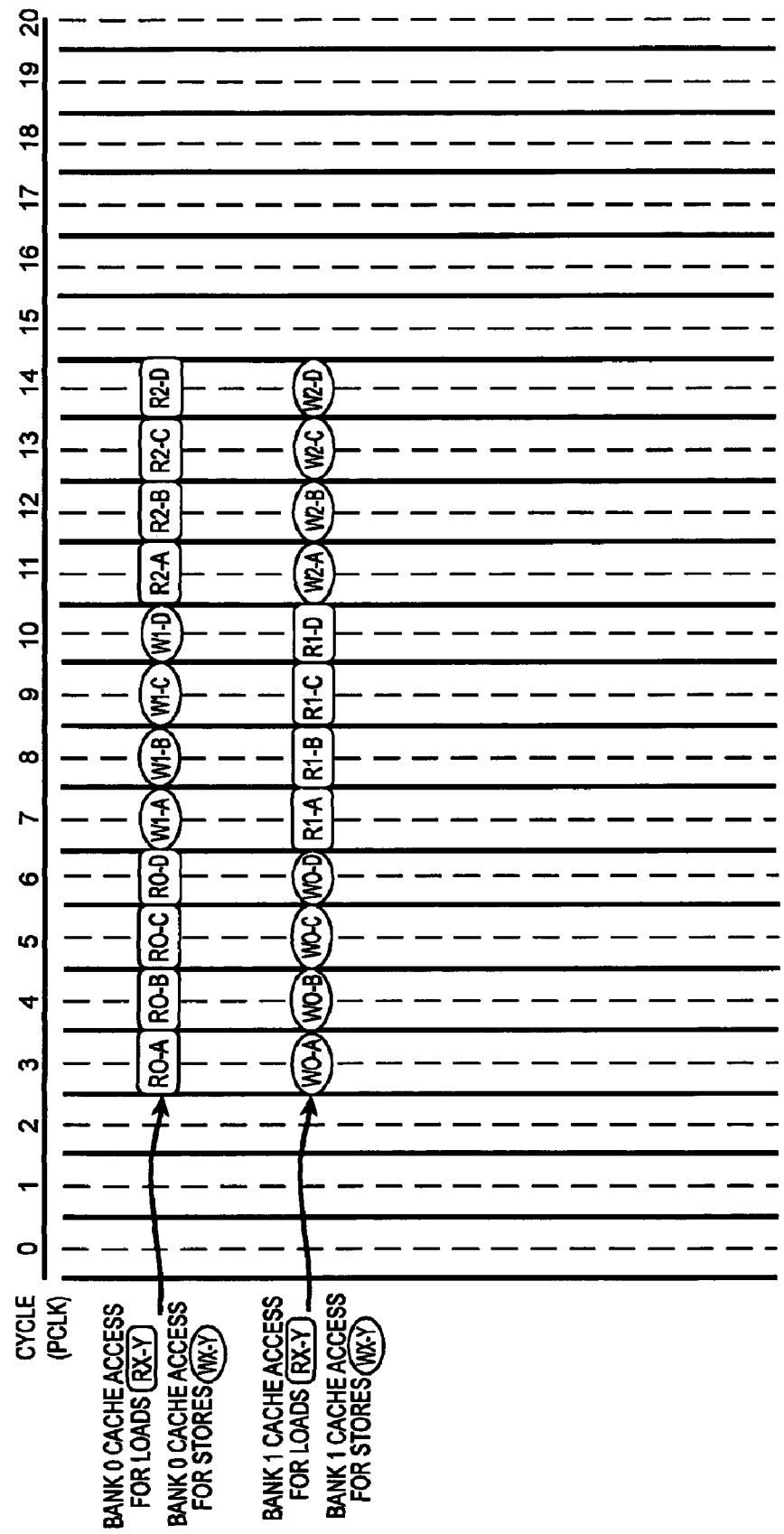
FIG. 8B is a timing diagram for a fourth embodiment of the cache management system.

FIG. 8B shows the timing diagram for the fourth embodiment of the L2 cache system that depicts the operation of the dual bank L2 cache of FIG. 8A and FIG. 3B. In this embodiment, not only stage 3 includes dual arbiters, but also stage 2 includes dual arbiters 526-0 and 526-1. In this arrangement, in a particular cycle, the L2 cache system 213 may commence a sequence of reads or a sequence of writes, and both sequences may start accesses to the respective cache banks at the same time, i.e. start during the same cycle or beat. For example, as seen in FIG. 8B, the L2 cache system 213 receives a load request and, in response, performs the requested load operation in cache accesses R0-A, R0-B, R0-C and R0-D during cycles 3, 4, 5 and 6 respectively, as read operations to BANK0. The L2 cache system 213 receives a store request and, in response, performs the requested write operation during cache accesses W0-A, W0-B, W0-C and W0-D to the other bank of the L2 cache, namely BANK1. Both the read sequence and the write sequence begin in the same cycle 3. The write operations occur during cycle 3, 4, 5 and 6, to service the store request. These are the same cycles that cache system 213 employs to service the load request.

Subsequent cache accesses to service cache read and write requests may then begin in cycle 7 without any dead cycles between ending a cache read access and starting a cache write access, and vice versa. For example, L2 cache system 213 receives a cache write request and, in response, commences cache accesses W1-A, W1-B, W1-C and W1-D during cycles 7, 8, 9 and 10. L2 cache system 213 receives a cache read request and, in response, commences cache accesses R1-A, R1-B, R1-C and R1-D during the same cycles 7, 8, 9 and 10 that system 213 employs to service the cache write request.

Subsequent cache accesses to service store and cache read and write requests may then begin in cycle 11 without any dead cycles between ending a cache read access and starting a cache write access, and vice versa. For example, L2 cache system 213 receives a load request and, in response, commences cache accesses R2-A, R2-B, R2-C and R2-D during cycles 11, 12, 13 and 14. L2 cache system 213 receives a cache write request and, in response, commences cache accesses W2-A, W2-B, W2-C and W2-D during the same cycles 11, 12, 13 and 14 that system 213 employs to service the cache store request.

Figure 8C:
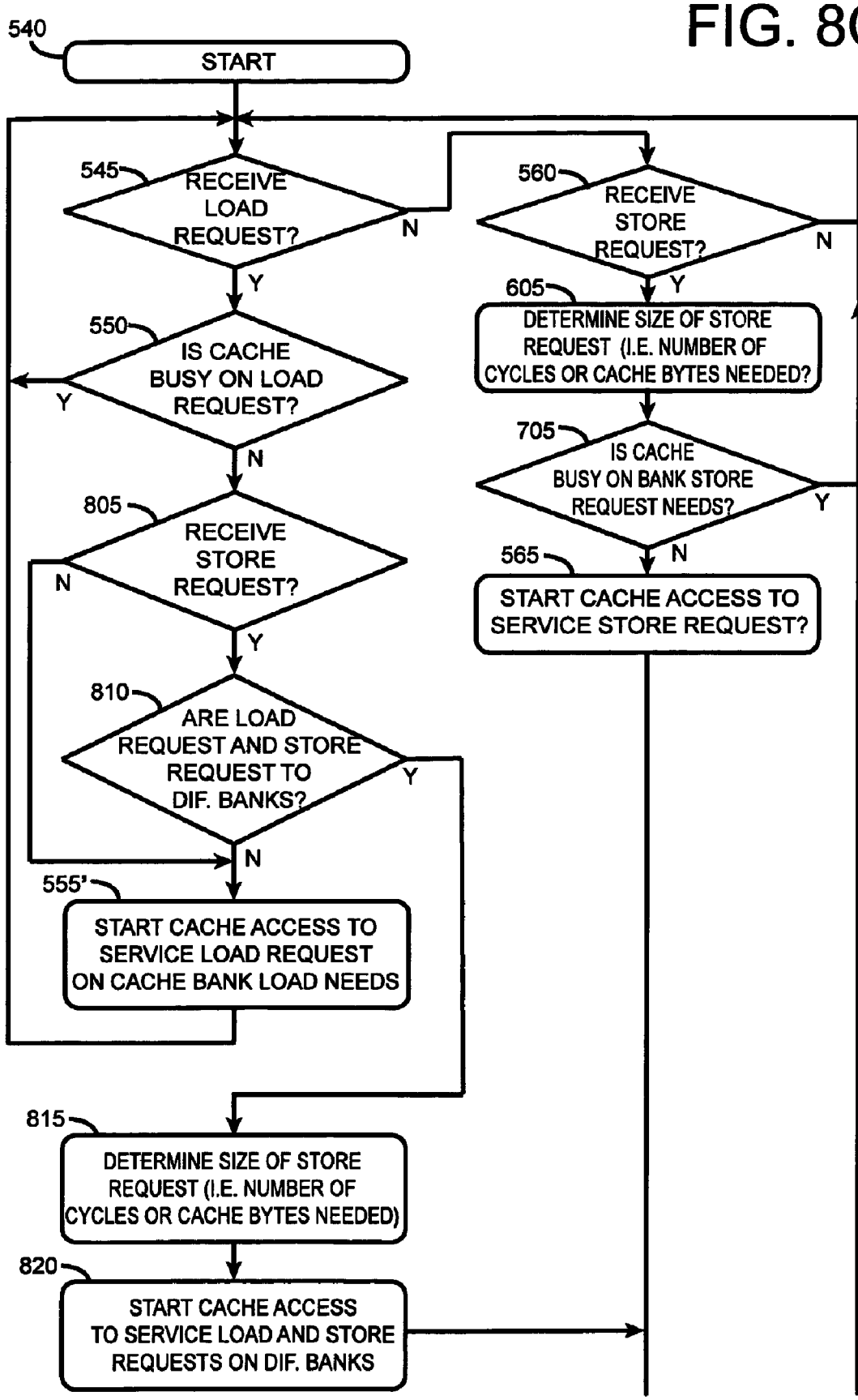
FIG. 8C is a flowchart for the fourth embodiment of the cache management system.
Figure 8D:
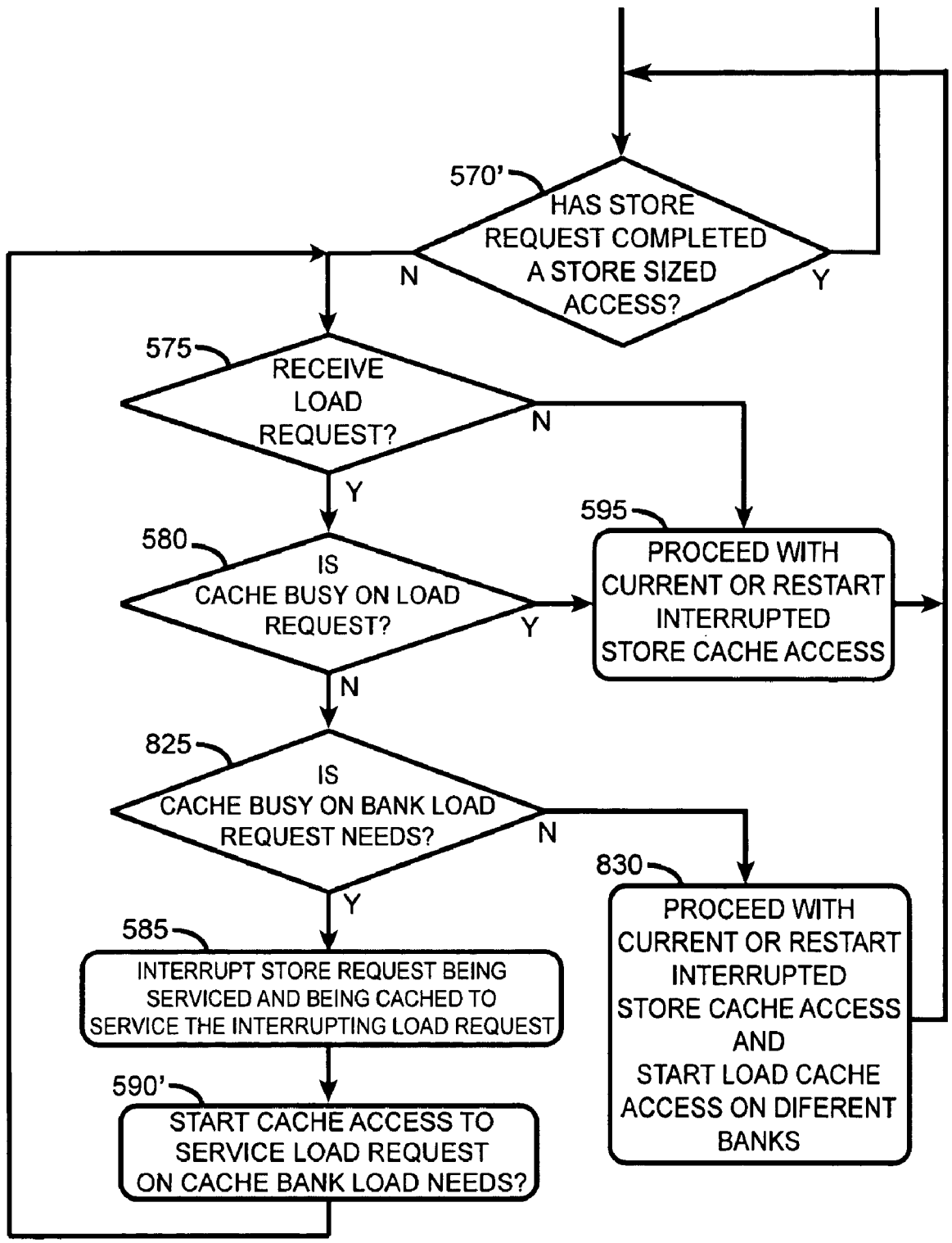
FIG. 8D continues the flowchart for the fourth embodiment of the cache management system of FIG. 8C.

FIGS. 8C and 8D together form a high level flowchart that depicts process flow in the fourth embodiment of the disclosed L2 cache management methodology. The flowchart of FIGS. 8C and 8D exhibits many similarities to the flowchart of FIG. 6B discussed above, except for the differences discussed below. These differences involve L2 cache system 213 starting an access of one cache bank to service a load request and at the same time starting an access of the other cache bank to service a store request, and vice versa.

As in the third embodiment of FIG. 7C, the fourth embodiment monitors for load requests at decision block 545 and determines if the cache banks are currently busy servicing a load request at decision block 550. After receiving a load request and determining that the cache memory 390' is not busy servicing another request, system 213 performs a test to determine if it also received a store request that desires access to one of the cache banks, as per decision block 805. If system 213 did receive such a store request, then system 213 performs an additional test to determine if the received load request and the received store request are for different cache banks, as per decision block 810. If the load request and the store request are not for different L2 cache banks, then arbitration mechanism of FIG. 8B allows the load request to win over the store request. In this event, L2 cache system 213 starts a cache access to service the load request based on the actual size needs of the load request, as per block 555'. However, if the load request and the store request are to different cache banks, then the arbitration mechanism sets up respective cache accesses to service the load and store requests. More particularly, L2 cache system 213 determines the size of the store request, namely the number of cache cycles or cache bytes needed to execute the store request, as per block 815. System 213 starts a cache access on one of the dual cache banks BANK0 and BANK1 to service the load request and starts an access of the remaining cache bank to service the store request, both accesses starting during the same cache cycle. Process flow then continues to decision block 540 as before.

Another difference in the flow chart of FIGS. 8C and 8D is that after L2 cache system 213 receives a load request, as per decision block 575, and determines that the cache memory is not already busy servicing another load request, as per decision block 580, system 213 performs another test to determine if the cache is busy servicing bank load request needs, as per decision block 825. In other words, decision block 825 tests to determine if the L2 cache memory 390' is currently busing servicing a load request according to the size or time requirements that the particular load request actually needs. If the L2 cache memory is busy servicing a load request according to its size or time needs in decision block 825, then system 213 interrupts a store request that is in progress accessing the cache memory to service the interrupting load request. However, if decision block 825 determines that the cache memory 390' is not currently busy servicing bank load request needs, then cache system 213 proceeds with servicing the current store cache accesses or restarting the interrupted store cache access and also starting a load cache access, as per block 830. This load cache access is to a different cache bank than the current store cache access or the restarted interrupted store cache access. Process flow then continues back to decision block 570' at which system 213 tests to determine if system 213 completed a store-sized access resulting from a load request, as before.

In summary, the L2 cache system 213 of the fourth embodiment employs dual second stage arbiters, dual third stage arbiters and dual cache banks BANK0 and BANK1 to enable the system to service a load request and a store request beginning at the same time without the occurrence of efficiency degrading dead cycles. System 213 may assign a load request to one cache bank while assigning a store request to the other cache bank, and vice versa. The resultant load operation may coincide, or occur in time simultaneously with, the resultant store operation. The arbitration mechanism provides that a load operation may interrupt a store operation already in progress in a particular cache bank.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    sending, by a processor element, a plurality of requests for memory operations to a cache memory, the cache memory including first and second cache banks, the memory operations including load operations and store operations, each load and store operation exhibiting a respective size requirement;
    arbitrating, by an arbitration mechanism, among the plurality of requests for memory operations to select a particular load operation and a particular store operation for access to the cache memory;
    arbitrating, by the arbitration mechanism, in a first arbitration stage among the load operation requests in the plurality of requests for memory operations, to provide the particular load operation for access to the cache memory;
    arbitrating, by the arbitration mechanism, in the first arbitration stage among the store requests, to provide the particular store operation for access to the cache memory;
    arbitrating, by the arbitration mechanism, in the first arbitration stage among read claim state machine requests, cast out state machine requests and snoop requests to determine a cache arbiter arbitration result;
    arbitrating, by the arbitration mechanism, in a second arbitration stage that includes first and second arbiters that operate in parallel to provide particular first and second store instructions to a third arbitration stage;
    commencing, by the arbitration mechanism, the particular load operation on the first cache bank during a first cache cycle;
    commencing, by the arbitration mechanism, the particular store operation on the second cache bank during the first cache cycle such that both the particular load operation and the particular store operation commence during the same first cache cycle; and
    performing, by the first and second cache banks, the particular load operation and the particular store operation simultaneously.

2. The method of claim 1, further comprising interrupting with a load operation, by a control logic, the particular store operation that is in progress in one of the first and second cache banks.

3. The method of claim 1, further comprising:
    determining, by a control logic, the respective size requirements of the store operations and the load operations in the plurality of requests;
    performing a first cache memory access, by the cache memory, in response to a load operation request, the first cache memory access being limited in size to the size requirement for the load operation determined by the control logic; and
    performing a second cache memory access, by the cache memory, in response to a store operation request, the second cache memory access being limited in size to the size requirement for the store operation determined by the control logic.

4. The method of claim 1, wherein the third arbitration stage includes third and fourth arbiters that are responsive to the first and second arbiters, respectively, of the second stage, the third and fourth arbiters of the third stage also being responsive to the particular load instruction from the first stage, the method further comprising:
    arbitrating, by the arbitration mechanism, in the third arbitration stage wherein the third and fourth arbiters operate in parallel to provide the particular load operation to the first cache bank and to provide one of the particular first and second store operations to the second bank for simultaneous access to the cache memory.

5. The method of claim 1, wherein the cache memory is an L2 cache memory.

6. The method of claim 1, wherein the processor element is a processor core that includes an L1 cache memory.

7. A cache memory system comprising:
a processor element; and
a cache memory, coupled to the processor element, that receives a plurality of requests for memory operations, the cache memory including first and second cache banks, the memory operations including load operations and store operations, each load and store operation exhibiting a respective size requirement, the cache memory including an arbitration mechanism that arbitrates among the plurality of requests for memory operations to select a particular load operation and a particular store operation for access to the cache memory, wherein the arbitration mechanism comprises a first arbitration stage that arbitrates among the load operation requests in the plurality of requests for memory operations, to provide the particular load operation for access to the cache memory, the first arbitration stage arbitrating among store requests to provide a selected store operation for access to the cache memory, the first arbitration stage arbitrating among read claim state machine requests, cast out state machine requests and snoop requests to determine a cache arbiter arbitration result, wherein the arbitration mechanism further comprises a second arbitration stage, coupled to the first arbitration stage, that includes first and second arbiters that operate in parallel to provide particular first and second store instructions to a third arbitration stage, and wherein the arbitration mechanism commences the particular load operation on the first cache bank during a first cache cycle and commences the particular store operation on the second cache bank during the first cache cycle such that both the particular load operation and the particular store operation commence during the same first cache cycle, the first and second cache banks performing the particular load operation and the particular store operation simultaneously.

8. The cache memory system of claim 7, further comprising interrupting with a load operation, by a control logic in the cache memory, the particular store operation that is in progress in one of the first and second cache banks.

9. The cache memory system of claim 7, further wherein a control logic determines the respective size requirements of the store operations and the load operations in the plurality of requests, wherein the cache memory performs a first cache memory access in response to a load operation request, the first cache memory access being limited in size to the size requirement for the load operation determined by the control logic, wherein the cache memory performs a second cache memory access in response to a store operation request, the second cache memory access being limited in size to the size requirement for the store operation determined by the control logic.

10. The cache memory system of claim 7, wherein the second stage arbitration result is the particular store operation, the arbitration mechanism further comprising:
a third arbitration stage, coupled to the second arbitration stage, that includes third and fourth arbiters that are responsive to the first and second arbiters, respectively, of the second stage, the third and fourth arbiters of the third stage also being responsive to the particular load instruction from the first stage, wherein the third and fourth arbiters operate in parallel to provide the particular load operation to the first cache bank and to provide one of the particular first and second store operations to the second bank for access to the cache memory simultaneously with the particular load operation.

11. The cache memory system of claim 7, wherein the cache memory is an L2 cache memory.

12. The cache memory system of claim 7, wherein the processor element is a processor core that includes an L1 cache memory.

13. A information handling system (IHS) comprising:
a processor element;
a cache memory, coupled to the processor element, that receives a plurality of requests for memory operations, the cache memory including first and second cache banks, the operations including load operations and store operations, each load and store operation exhibiting a respective size requirement, the cache memory including an arbitration mechanism that arbitrates among the plurality of requests for memory operations to select a particular load operation and a particular store operation for access to the cache memory, wherein the arbitration mechanism comprises a first arbitration stage that arbitrates among the load operation requests in the plurality of requests for memory operations, to provide the particular load operation for access to the cache memory, the first arbitration stage arbitrating among store requests to provide a selected store operation for access to the cache memory, the first arbitration stage arbitrating among read claim state machine requests, cast out state machine requests and snoop requests to determine a cache arbiter arbitration result, wherein the arbitration mechanism further comprises a second arbitration stage, coupled to the first arbitration stage, that includes first and second arbiters that operate in parallel to provide particular first and second store instructions to a third arbitration stage; and wherein the arbitration mechanism commences the particular load operation on the first cache bank during a first cache cycle and commences the particular store operation oh the second cache bank during the first cache cycle such that both the particular load operation and the particular store operation commence during the same first cache cycle, the first and second cache banks performing the particular load operation and the particular store operation substantially simultaneously; and
a system memory coupled to the cache memory.

14. The IHS of claim 13, wherein the arbitration mechanism further comprises:
a third arbitration stage, coupled to the second arbitration stage, that includes third and fourth arbiters that are responsive to the first and second arbiters, respectively, of the second stage, the third and fourth arbiters of the third stage also being responsive to the particular load instruction from the first stage, wherein the third and fourth arbiters operate in parallel to provide the particular load operation to the first cache bank and to provide one of the particular first and second store operations to the second bank for access to the cache memory simultaneously with the particular load operation.

15. The IHS of claim 13, further comprising interrupting with a load operation, by a control logic in the cache memory, the particular store operation that is in progress in one of the first and second cache banks.

16. The IHS of claim 13, wherein the control logic determines the respective size requirements of the store operations and the load operations in the plurality of requests, wherein the cache memory performs a first cache memory access in response to a load operation request, the first cache memory access being limited in size to the size requirement for the load operation determined by the control logic, wherein the cache memory performs a second cache memory access in response to a store operation request, the second cache memory access being limited in size to the size requirement for the store operation determined by the control logic.

17. The IHS of claim 13, wherein the cache memory is an L2 cache memory.

18. The IHS of claim 13, wherein the processor element is a processor core that includes an L1 cache memory.

* * * * *